US012717646B2

(12) United States Patent
Abhishek

(10) Patent No.: US 12,717,646 B2
(45) Date of Patent: Aug. 25, 2026

(54) FACILITATING REAL-TIME TRANSPORT PROTOCOL SIGNALING FOR ELASTIC DISTRIBUTED COMPUTING FOR RESOURCE INTENSIVE TASKS IN ADVANCED NETWORKS

(71) Applicant: AT&T Intellectual Property I, L.P., Atlanta, GA (US)

(72) Inventor: Rohit Abhishek, Overland Park, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 783 days.

(21) Appl. No.: 17/931,592

(22) Filed: Sep. 13, 2022

(65) Prior Publication Data

US 2024/0086254 A1 Mar. 14, 2024

(51) Int. Cl.
*G06F 9/50* (2006.01)

(52) U.S. Cl.
CPC .......... *G06F 9/5077* (2013.01); *G06F 9/5005* (2013.01); *G06F 9/5072* (2013.01); *G06F 9/5088* (2013.01)

(58) Field of Classification Search
CPC ..... H04L 69/00; H04L 69/03; H04L 47/2416; H04L 47/24; H04L 47/2466; H04L 65/00;
(Continued)

(56) References Cited

U.S. PATENT DOCUMENTS 6,917,979 B1 * 7/2005 Dutra .................. H04L 41/5009 709/229
9,052,958 B2 6/2015 Coleman et al.
(Continued)

FOREIGN PATENT DOCUMENTS

JP 2016149630 A * 8/2016
WO 2009062903 A1 5/2009
WO 2022013331 A1 1/2022

OTHER PUBLICATIONS

3GPP "Split Rendering Media Service Enabler" Qualcomm Incorporated; 3GPP TSG|WG-SA4 Meeting #117-e document id No. S4-220079 (Feb. 2022).
(Continued)

*Primary Examiner* — Rachel J Hackenberg
(74) *Attorney, Agent, or Firm* — Guntin & Gust, PLC; Daniel P. Williams

(57) ABSTRACT

Facilitating elastic distributed computing for resource intensive tasks including split rendering in advanced networks is provided herein. Operations of a system include receiving information indicative of a request for split rendering for an application executing at a user equipment. The information is received via a transport protocol header extension. The operations can also include, based on the information indicative of the request, determining that an available computational resource capacity at the user equipment is insufficient to process the application executing at the user equipment. Further, the operations can include, based on the determining, enabling a first rendering of a first portion of the application at a first device and a second rendering of a second portion of the application at a second device different from the first device.

20 Claims, 13 Drawing Sheets

(58) Field of Classification Search
CPC ..... H04L 47/801; H04L 67/148; H04L 67/14; H04L 65/65; H04L 65/1101; H04L 69/16; H04L 65/1104; H04L 69/161; H04N 21/6437; H04N 21/643; H04N 21/64322; G06F 9/5077; G06F 9/5005; G06F 9/5072; G06F 9/5088; G06F 9/5083; G06F 2209/5019; G06F 2209/503; G06F 9/5038; G06F 2209/509; G06F 9/5044; G06F 9/542
See application file for complete search history.

(56) References Cited

U.S. PATENT DOCUMENTS

| | | | | |
|---|---|---|---|---|
| 2013/0173819 | A1* | 7/2013 | Lee | H04N 21/2402 709/231 |
| 2014/0176583 | A1* | 6/2014 | Abiezzi | G06F 9/5044 345/522 |
| 2019/0327506 | A1* | 10/2019 | Zou | H04N 21/2223 |
| 2022/0247635 | A1* | 8/2022 | Guim Bernat | H04L 9/3213 |
| 2022/0255988 | A1 | 8/2022 | Salmasi | |

OTHER PUBLICATIONS

Non-Final Office Action received for U.S. Appl. No. 17/929,860, dated Feb. 2, 2023, 155 pages.

* cited by examiner

400
$108_M$
Cloud
$110_M$
Edge
$112_M$
$108_2$
Cloud
$110_2$
Edge
$112_2$
$108_1$
Cloud
$110_1$
Edge
$112_1$
MRF/MCU
402
102
End Device
$106_N$
End Device
$106_2$
End Device
$106_1$
104

MOBILE HANDSET
APPLICATIONS 1206
CLIENT (STORE, DISCOVERY, PLAY) 1242
TRIGGER COMPONENT 1238
HYSTERESIS COMPONENT 1236
SIP CLIENT 1240
FIRMWARE 1208
VIDEO COMP 1230
DISPLAY 1212
CAMERA 1222
SERIAL I/O INTERFACE 1214
USER INPUT 1234
PROCESSOR 1202
MEMORY 1204
AUDIO I/O 1216
SUBSCRIBER IDENTITY SYSTEM 1218 1220
COMMUNICATION COMPONENT 1210
CELL TCVR 1211
WIFI TCVR 1213
LOCATION COMPONENT 1232
POWER SOURCE 1224
POWER I/O 1226

FACILITATING REAL-TIME TRANSPORT PROTOCOL SIGNALING FOR ELASTIC DISTRIBUTED COMPUTING FOR RESOURCE INTENSIVE TASKS IN ADVANCED NETWORKS

TECHNICAL FIELD

This disclosure relates generally to the field of mobile communications and, for example, to metaverse services in advanced networks, e.g., Fourth Generation (4G) networks, Fifth Generation (5G) networks, Sixth Generation (6G) networks, or beyond.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) or other advanced standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
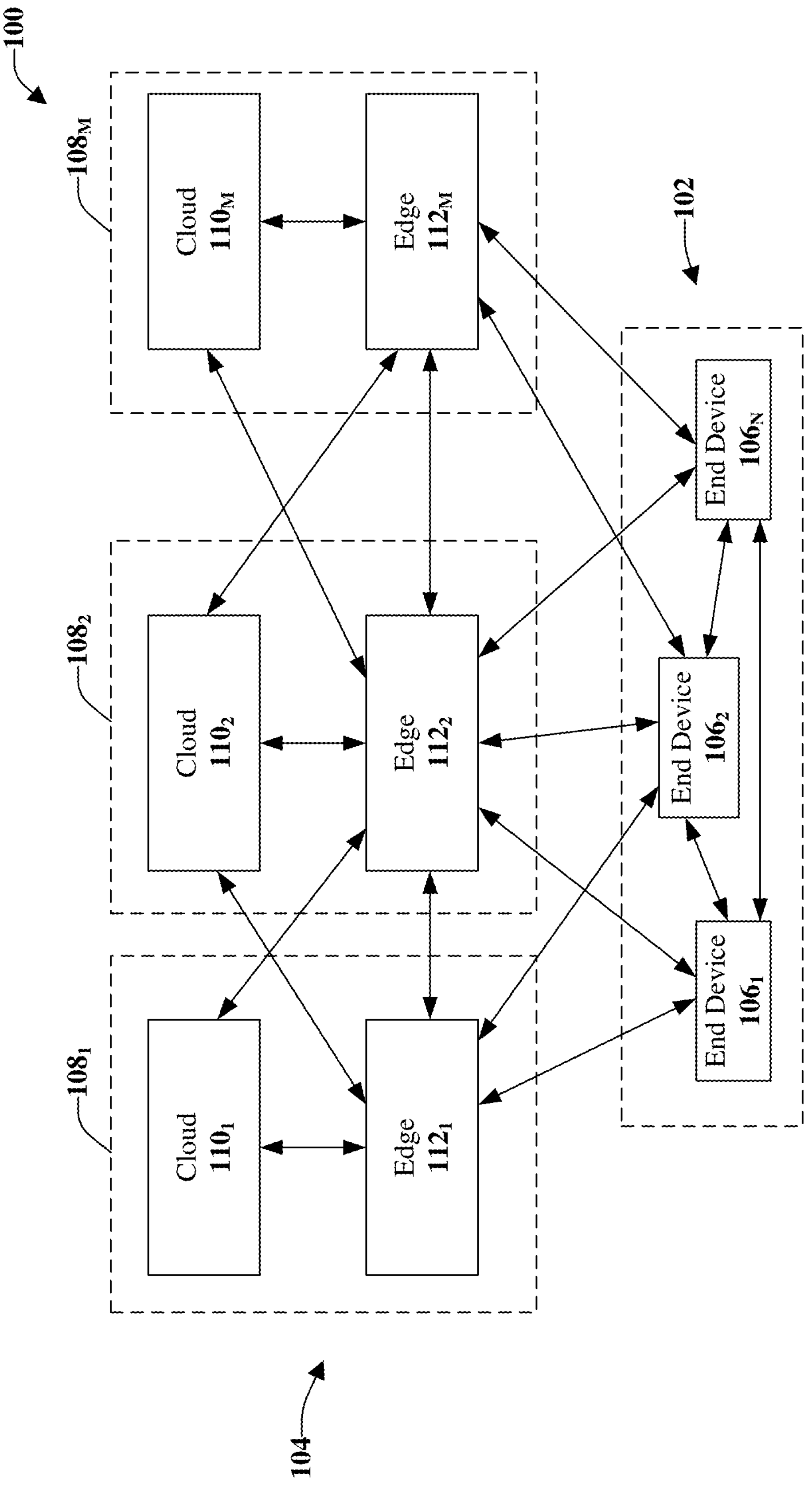
FIG. 1 illustrates an example, non-limiting, distributed computing architecture in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Various devices, also referred to as end devices and/or user equipment (UEs), are increasingly utilized to perform applications associated with metaverse and/or immersive media services. Immersive media is defined by immersive technologies that attempt to create, or imitate, the physical world through digital simulation, thereby stimulating any and/or all human sensory systems to create the perception of the user being physically present inside the scene.

There are different types of immersive media technologies that can be utilized. These different types include, but are not limited to, Metaverse, Virtual Reality (VR), Augmented Reality (AR), Mixed Reality (MR), Light Field and/or Holographic, and so forth. Metaverse refers to a fully realized digital world that exists beyond the one in which we live and may or may not need a headset. VR refers to a digital environment replacing the user's physical environment by using a headset to place the user in a computer-generated world. AR, on the other hand, takes digital media and layers the digital media on the real world by using either a clear vision and/or a smartphone. MR refers to the blending of the real world with the digital world, thereby creating an environment in which technology and the physical world can co-exist. Light field and/or Holographic technologies include light rays in three-dimensional (3D) space with rays coming from each point and direction. This is based on the concept that everything seen around is illuminated by light coming from any source, traveling via space and hitting the object's surface where the light is partly absorbed and partly reflected to another surface before reaching the eyes. What exact light rays reach the eyes depends on the user's precise position in the light field, and as the user moves around, the user perceives part of the light field and uses that to get an idea about the object's position.

Different immersive technologies, especially the concept of Metaverse, are expanding and are requested by users. In the Metaverse world, realistic and real-time visual effects can be important. Life-like characters, ingenious scenes, and exquisite worlds are inseparable from the availability of large-scale rendering technology. Powerful real-time rendering will be the backbone for Metaverse and might need a Graphics Processing Unit based (GPU-based) resource to process the scenes. Hence, an expensive GPU-based end device is contemplated to process the Metaverse scenes. The same can apply to holographic, light-field, AR, and/or VRbased media. Therefore, to make the concept of immersive media and/or Metaverse scalable, split rendering-based technology can be used as part of the infrastructure, which can offload some or most of the tasks to the edge or the cloud. This split rendering can be dependent on the end device's capability to process any scene. Therefore, the disclosed embodiments are related to the signaling between the end device and the cloud and/or edge to communicate the task split between and/or among cloud, edge, and the end user in an optimized way to reduce latency and resource utilization.

Various systems, including a 5G system, can offer several capabilities including split rendering that would pave the way for making these demanding media services available to all users, independently of their end device capabilities. For example, access to edge computing can allow the rendering of complex 3D scenes in powerful edge servers and then displaying such scenes on the end devices. It is also supported by Quality of Service (QoS) allocation to ensure that the operation takes place smoothly. One of the objectives for this work item is to specify the control protocols for establishing and managing split rendering sessions.

Distributed cooperative computing can be defined as a system that includes multiple components on multiple systems and/or nodes, but which runs as a single system. These systems and/or nodes can be physically close together and connected by a local network, or they can be geographically distant and connected by a wide area network. A distributed system can include any number of possible configurations. The goal of distributed cooperative computing is to make such a network operate as a single system.

There has been various research on bringing cloud to the edge and introducing the concept of distributed computing. How the resource split works with distributed computing is provided with the disclosed embodiments. Accordingly, described herein are systems, methods, articles of manufacture, and other embodiments or implementations that can facilitate distributed computing for resource intensive tasks in advanced networks.

According to an embodiment, a method can include receiving, by network equipment comprising a processor, a signal transmitted via a transport protocol header. The method can also include, based on the signal, determining, by the network equipment, that a task executing at a user equipment utilizes more resources than a defined level of resources. Further, the method can include, based on the determining, facilitating, by the network equipment, split processing of the task between the user equipment and the network equipment.

In an example, the transport protocol header is a real-time transport protocol header. In another example, the user equipment is an internet of things device or an internet of everything device.

In some implementations, the facilitating can include facilitating split processing of the task between the user equipment and edge network equipment. Alternatively, or additionally, the facilitating can include facilitating split processing of the task between the user equipment and cloud network equipment.

According to some implementations, the receiving can include receiving a transport protocol header extension from the user equipment. In accordance with some implementations, receiving the signal can include receiving information indicative of a latency tolerance defined for the task executing at the user equipment. According to some implementations, receiving the signal can include receiving priority information indicative of a priority of the task executing at the user equipment. In some implementations, the signal transmitted via the transport protocol header is a broadcast signal that includes resource distribution information indicative of a resource distribution applicable to the task executing at the user equipment.

Another embodiment relates to a system that includes a processor and a memory that stores executable instructions that, when executed by the processor, facilitate performance of operations. The operations can include receiving information indicative of a request for split rendering for an application executing at a user equipment. The information is received via a transport protocol header extension. The operations can also include, based on the information indicative of the request, determining that an available computational resource capacity at the user equipment is insufficient to process the application executing at the user equipment. Further, the operations can include, based on the determining, enabling a first rendering of a first portion of the application at a first device and a second rendering of a second portion of the application at a second device different from the first device.

According to an implementation, the first rendering can include a first execution of the first portion of the application at the first device. Further to this implementation, the second rendering can include a second execution of the second portion of the application at the second device.

In an example, the first device is the user equipment, and the second device is network equipment. According to another example, the user equipment is first user equipment, the first device is the first user equipment, and the second device is a second user equipment. In accordance with another example, the first device is edge equipment, and the second device is cloud equipment.

In accordance with some implementations, the operations can include identifying the first portion with first identification information and the second portion with second identification information. The first identification information and the second identification information can enable a mapping between the first portion and the second portion.

A further embodiment relates to a non-transitory machine-readable medium, comprising executable instructions that, when executed by a processor, facilitate performance of operations. The operations can include receiving an indication, via a real-time transport protocol header extension, that a resource-intensive application is to be enabled for a user equipment via an elastic computing system. The operations can also include migrating the resource-intensive application from the user equipment to equipment associated with the elastic computing system.

In an example, the user equipment is first user equipment, and the elastic computing equipment of the elastic computing system includes a second user equipment, network equipment, or both the second user equipment and the network equipment. According to another example, the migrating can include enabling distributed cooperative computing for the user equipment.

FIG. 1 illustrates an example, non-limiting, distributed computing architecture 100 in accordance with one or more embodiments described herein. The distributed computing architecture 100 can be a geographically located elastic distributed cooperative computing architecture according to some implementations.

Computing devices are based on the increase in computer power. Following Moore's law, the computing power continues to increase exponentially as a result of adding more processing cores and bandwidth, besides an increase in speed and reduction in chip size. However, with high-performance applications, capacity and processing requirements are increasing. To bridge this gap, an edge, cloud, end device and/or user-based rendering architecture should be utilized.

Edge-based or cloud-based computing offers the end-user more ways of accessing the massive computational capacity needed for modern computer graphics. With the current debate on how much processing can be fit in a smart-phone or any immersive media-based device such as Augmented Reality and/or Virtual Reality (AR/VR) to render high-quality video frames, the shift has moved to cloud-end devices or edge-end devices or cloud-edge-end device-based collaborative rendering since this elevates an on-line game (e.g., a multi-player game, a real time game, and so on). Therefore, if fast enough connections to online computing resources can be opened up with the help of 5G, 6G, other advanced-based technologies, all small devices could become a supercomputer capable of streaming real-time videos and games in Metaverse or immersive media-based technologies.

More specifically, FIG. 1 illustrates a distributed computing architecture 100 at a defined geographical location. The distributed computing architecture 100 includes a Local Area Network (LAN 102) and a cloud-edge communication network 104. The LAN 102 includes one or more end devices or user equipment (UE), illustrated as a first end device $\mathbf{106}_1$, a second end device $\mathbf{106}_2$, through N end device $\mathbf{106}_N$, where N is an integer. The cloud-edge communication network 104 includes one or more cloud-edge equipment, illustrated as first cloud-edge equipment $\mathbf{108}_1$, second cloud-edge equipment $\mathbf{108}_2$, through M cloud-edge equipment $\mathbf{108}_M$, where M is an integer. The first cloud-edge equipment $\mathbf{108}_1$ includes first cloud equipment $\mathbf{110}_1$ and first edge equipment $\mathbf{112}_1$. The second cloud-edge equipment $\mathbf{108}_2$ includes second cloud equipment $\mathbf{110}_2$ and second edge equipment $\mathbf{112}_2$. The M cloud-edge equipment $\mathbf{108}_M$ includes M cloud equipment $\mathbf{110}_M$ and M edge equipment $\mathbf{112}_M$. It is noted that although a same number of cloud equipment and edge equipment are illustrated and described, the disclosed aspects are not limited to the same number and there can be a different number of cloud equipment as compared to edge equipment.

According to an implementation, a real-time transport protocol based (RTP-based) solution can be used for a cloud-end device/edge-end device architecture or a cloud-edge-end device-based rendering architecture to signal the split between the end device (e.g., the first end device $\mathbf{106}_1$, the second end device $\mathbf{106}_2$, through the N end device $\mathbf{106}_N$) and the cloud-edge equipment (e.g., the first cloud-edge equipment $\mathbf{108}_1$, the second cloud-edge equipment $\mathbf{108}_2$, through the M cloud-edge equipment $\mathbf{108}_M$). In such a manner, the need for the end device to have a Graphics Processing Unit (GPU) based system can be reduced and/or mitigated. The task split between the edge and the end device can be dynamic or static. However, the selection of protocols to signal the split can be based on whether the split is static or dynamic.

In another embodiment, when the RTP-based solution is used, the end device can signal for enablement of split rendering. For example, the signal to enable split rendering can be transmitted by the end device based on a determination, at the end device, that the end device does not have enough computational resources. To signal an enablement of the split rendering, the end device can send to the cloud-edge a signal that includes an RTP header extension. RTP stream packets can indicate, in an RTP header extension, the split of the resources between the end device/device LAN cloud/edge/cloud.

In the same or another embodiment, the Uniform Resource Identifier (URI) for declaring the enabling of split rendering header extension in a Session Description Protocol (SDP) extmap attribute and mapping to a local extension header is:

uri:extmap:rtp-hdrext:enable_split_rendering.

In the same or another embodiment, the header extension might be present only in the first packet of the RTP stream and might be repeated when the split ratio needs to be updated for optimality or when the end device runs out of resources. The enablement parameter can be assigned a value of “0” or “1”. In this case, “0” can indicate the end-device has enough resources to perform the computation by itself and “1” can indicate the end device does not have enough resources to perform the task. However, the disclosed embodiments are not limited to this implementation. Instead in some implementations “0” can indicate the end device does not have enough resources to perform the task and “1” can indicate the end-device has enough resources to perform the task by itself.

Figure 2:
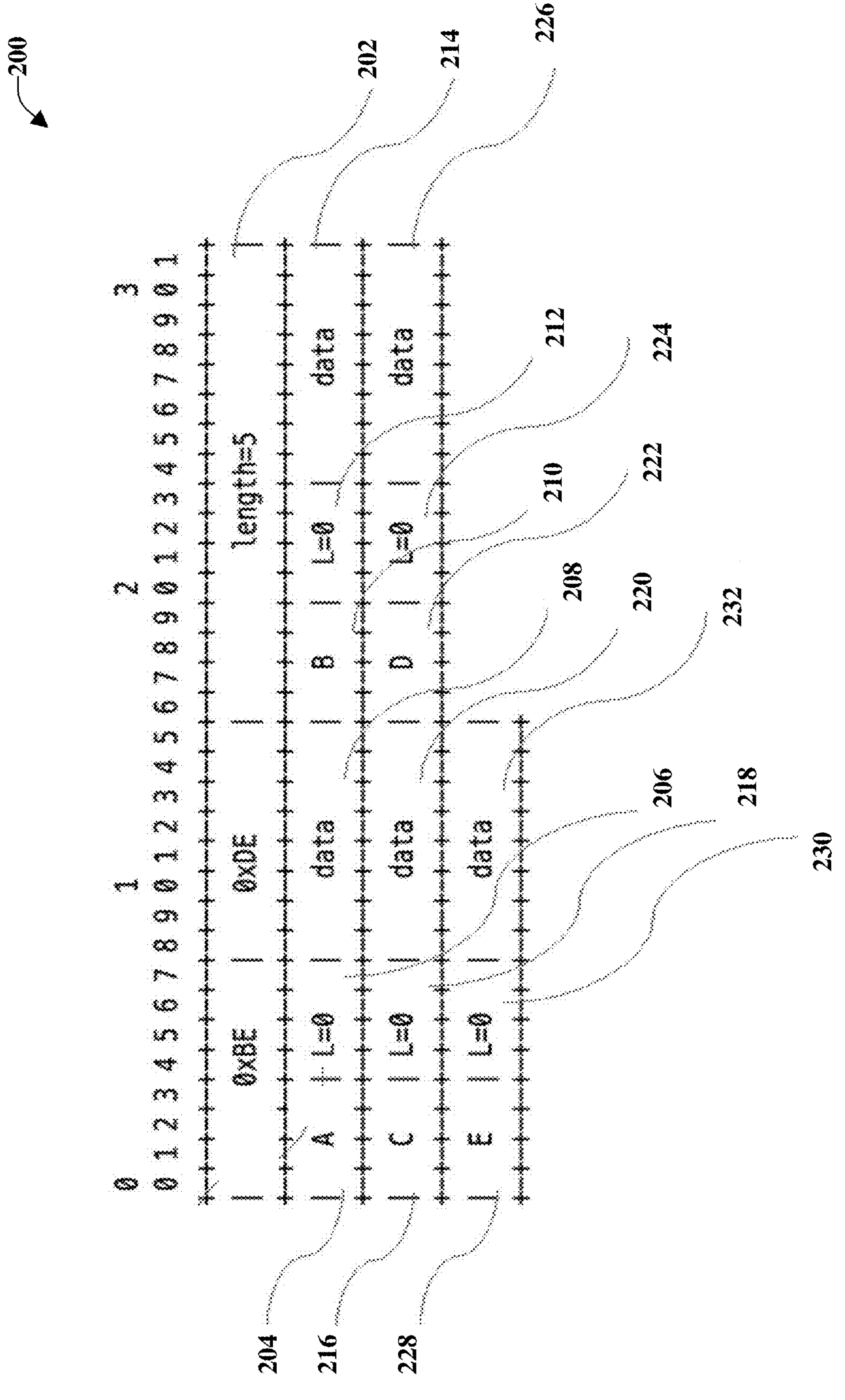
FIG. 2 illustrates an example, non-limiting, one-byte header format in accordance with one or more embodiments described herein.

FIG. 2 illustrates an example, non-limiting, one-byte header format 200 in accordance with one or more embodiments described herein. In the one-byte header form of extensions, there is a 16-bit value that has a fixed bit pattern ØxBEDE. In this example, the length available after transmission of the data is 5, as indicated at 202. It is noted that in this example, although 5 lengths are available, a different number of lengths can be available depending on the implementation.

In the case of the one-byte header format 200, the 4-bit length (len) field is the number minus one of data bytes transported in the header extension element following the one-byte header. Therefore, the value zero in this field indicates that one byte of data follows.

Each extension element starts with a byte containing an ID and a length. Thus, the ID A 204 indicates whether or not split rendering is to be enabled (e.g., enable_split_rendering) and has an indicated length 206 of zero (L=0), thus one bye of data 208 follows. The ID B 210 indicates a resource split (e.g., resource_split) and has an indicated length 212 of zero (L=0), thus one byte of data 214 follows. Further, ID C 216 indicates latency tolerance (e.g., latency_tolerance) and has an indicated length 218 of zero (L=0), thus one byte of data 220 follows. ID D 222 indicates a priority of the task (e.g., task priority) and has an indicated length 224 of zero (L=0), thus one byte of data 226 follows. Furthermore, ID E 228 indicates a synchronization of the task (e.g., task-synchronization) and has an indicated length 230 of zero (L=0), thus one byte of data 232 follows.

Figure 3:
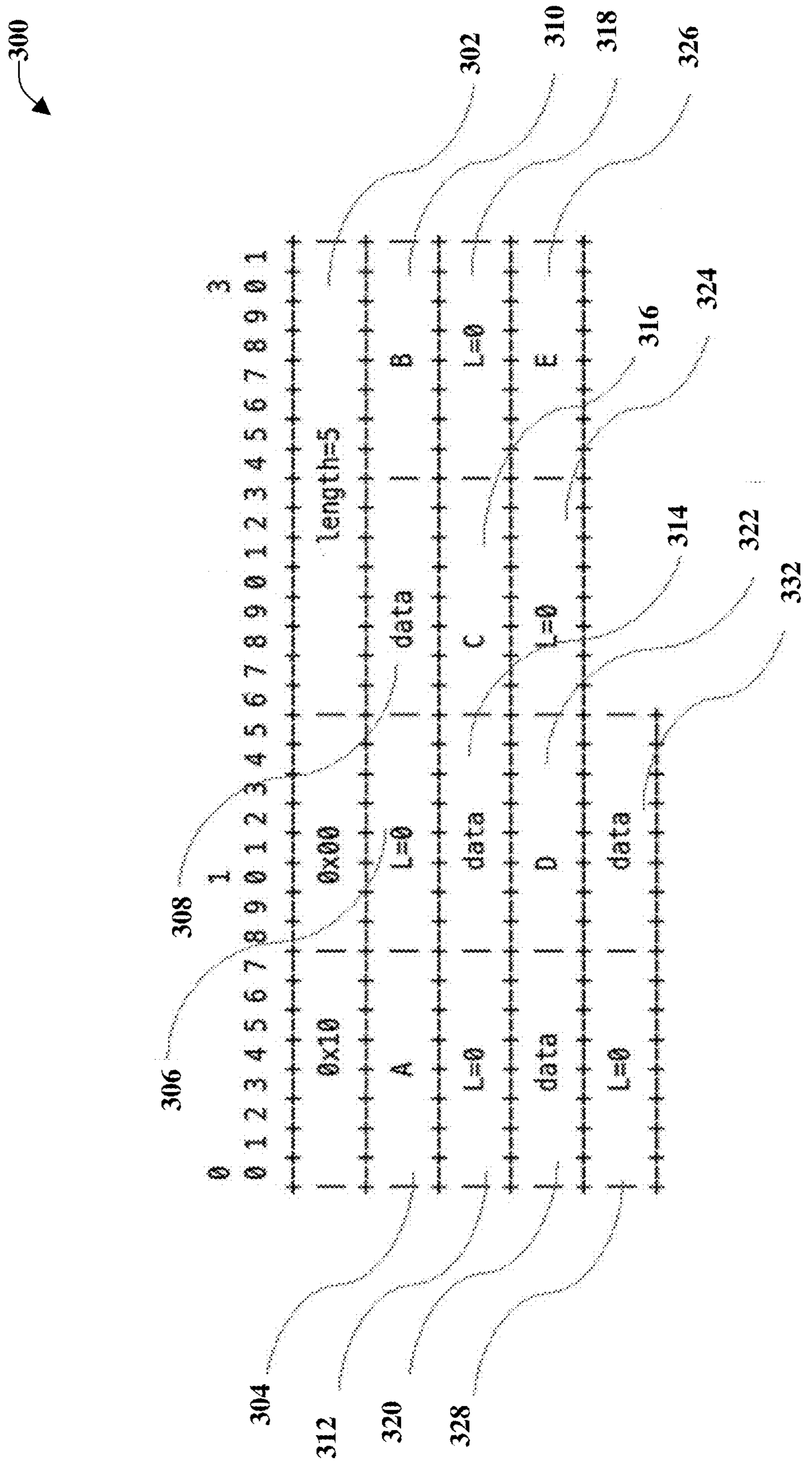
FIG. 3 illustrates an example, non-limiting, two-byte header format in accordance with one or more embodiments described herein.

FIG. 3 illustrates an example, non-limiting, two-byte header format 300 in accordance with one or more embodiments described herein. In this example, the length available after transmission of the data is 5, as indicated at 202. It is noted that in this example, although 5 lengths are available, a different number of lengths can be available depending on the implementation. In the case of the two-byte header format 300, the 8-bit len (8-bit length) field contains the exact number of values carried in the extension. Thus, the value zero (0) indicates there is no subsequent data.

Each extension element starts with a byte containing an ID and a length. Thus, the ID A 304 indicates whether or not split rendering is to be enabled (e.g., enable_split_rendering) and has an indicated length 306 of zero (L=0), and the associated data 308 follows. The ID B 310 indicates a resource split (e.g., resource_split) and has an indicated length 312 of zero (L=0), and the associated data 314 follows. Further, ID C 316 indicates latency tolerance (e.g., latency_tolerance) and has an indicated length 318 of zero (L=0), and the associated data 320 follows. ID D 322 indicates a priority of the task (e.g., task priority) and has an indicated length 324 of zero (L=0), and the associated data follows. Furthermore, ID E 326 indicates a synchronization of the task (e.g., task-synchronization) and has an indicated length 328 of zero (L=0), and the associated data 330 follows.

In accordance with additional or alternative implementations, the various connections (or connection types) can be enabled as indicated by the arrows in FIG. 1. For example, a connection type can be between a single end-device and a single cloud-edge (e.g., between the first end device $\mathbf{106}_1$ and the first cloud-edge equipment $\mathbf{108}_1$). Another connection type can be a single end-device to multiple cloud-edges (e.g., between the second end device $\mathbf{106}_2$, the first cloud-edge equipment $\mathbf{108}_1$, the second cloud-edge equipment $\mathbf{108}_2$, through the M cloud-edge equipment $\mathbf{108}_M$). Yet another connection type can be between multiple end-devices and multiple cloud-edges (e.g., between the first end device $\mathbf{106}_1$, the second end device $\mathbf{106}_2$, the N end device $\mathbf{106}_N$, the first cloud-edge equipment $\mathbf{108}_1$, the second cloud-edge equipment $\mathbf{108}_2$, through the M cloud-edge equipment $\mathbf{108}_M$). Still another connection type can be between a single end-device to a single end-device (e.g., between the second end device $\mathbf{106}_2$ and the N end device $\mathbf{106}_N$). Another connection type can be between a single end-device to multiple end-devices (e.g., between the first end device $\mathbf{106}_1$, the second end device $\mathbf{106}_2$, and the N end device $\mathbf{106}_N$). Further to these additional and/or alternative implementations, each end-device can be in a separate RTP session with separate RTP header extensions when connected in any of the connection types described herein.

According to some implementations, the end-device may, in its RTP header extension offer, indicate the task split or the percentage of tasks that would need to be migrated to the edge or the cloud (e.g., the upper layer). The URI for declaring the enabling of split rendering header extension in a Session Description Protocol (SDP) extmap attribute and mapping it to a local extension header identifier is:

uri:extmap:rtp-hdrext: resource_split.

In some implementations, the edge and/or the cloud can determine that the task split should occur. Further to these implementations, the edge and/or the cloud can, in its RTP header extension, indicate the task split or the percentage of tasks that would need to be performed at the edge, cloud, and/or the end-device (depending on the connection type).

According to some implementations, the end-device in its RTP header extension may signal additional parameters. Such parameters include, but are not limited to, latency to prioritize tasks at the edge or the cloud. This can be indicated by including the below URI in the SDP negotiation.

uri:extmap:rtp-hdrext: latency_tolerance.

According to an additional or alternative implementation, each task can be assigned a priority, which may help the cloud or the edge to decide which task to prioritize if there are multiple requests with limited resources. This can be indicated via RTP-header and by using the following URI in the SDP offer/answer:

uri:extmap:rtp-hdrext:task_priority.

The parameter "task_priority" can be helpful in situations when multiple end devices are connected to the same cloud-edge. Accordingly, the parameter "task_priority" can help the cloud-edge to prioritize resources for different end-devices during stressed situations.

In additional, or alternative, implementations, if the end device sends an RTP header with the extension "resource_split," the edge can selectively accept the offer. If the edge accepts the offer, the edge performs the task requested via use of the computing resources of the edge. If the resources at the edge are insufficient, the edge can offload some or all of the tasks to the cloud. However, in this case, the traffic latency should still be respected. The edge and/or the cloud, after accepting the offer, can also renegotiate the offer during the session if one or more higher priority tasks arrive.

In some implementations, to relate all tasks in case a task has been split and sent to multiple cloud-edges and/or end-users and additional RTP header extension may be used since the data would be separated and transported via different sessions. The URI for the same would be:

uri:extmap:rtp-hdrext:task_synchronization.

In this regard for the avoidance of doubt, any embodiments described herein in the context of optimizing latency are not so limited and should be considered also to cover any techniques that implement underlying aspects or parts of the described aspects to improve and/or reduce latency, even if resulting in a sub-optimal variant obtained by relaxing aspects or parts of a given implementation or embodiment.

In another embodiment, the UE (e.g., end device) can send all information about resource distribution, task split, and so forth to all edge node and/or cloud nodes. For example, the end device can send more than just information about that particular node. This can be helpful in situations when the end device does not have enough resources to compile all the processed tasks from various edge nodes and/or cloud nodes.

In the same or another embodiment, there can be various scenarios that can be helpful in compiling different processed tasks from various edge/cloud when end device is out of resources. For example, when there is a Multimedia Resource Function and/or a Multipoint Control Unit (MRF/MCU 402), as will be discussed with respect to FIG. 4, the end device can signal the MRF/MCU about its scarcity of resources and the MRF/MCU 402 can compile different tasks and send the finished task to the end device. This signaling can be performed via SDP or RTP header extension. If SDP is used, the parameter "resource_process" can be used to signal; whereas if RTP header extension is used the below URI can be used:

uri:extmap:rtp-hdrext: resource_process.

When there is not a network-based element present as illustrated in FIG. 1, the end device can signal one of the edge/clouds to act as the master compiler. When this occurs, the end device can signal the other edge/cloud which are processing a part of the task the address of the master compiler. This can be performed via UDP signaling.

Figure 4:
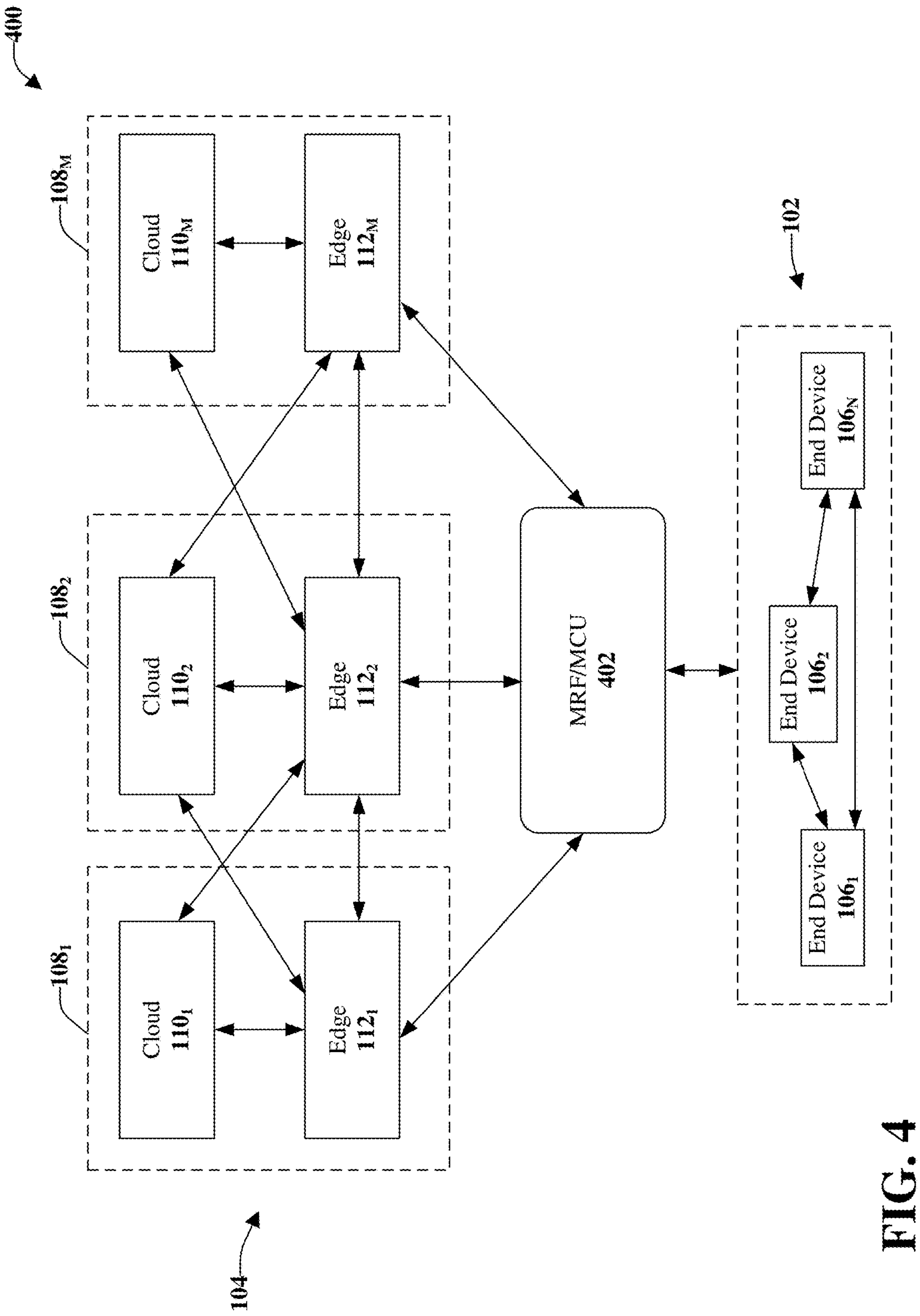
FIG. 4 illustrates an example, non-limiting, elastic distributed computing architecture in accordance with one or more embodiments described herein.

FIG. 4 illustrates an example, non-limiting, elastic distributed computing architecture 400 in accordance with one or more embodiments described herein. Repetitive description of like elements employed in other embodiments described herein is omitted for sake of brevity. The elastic distributed computing architecture 400 can be configured to perform functions associated with the distributed computing architecture 100 of FIG. 1 and vice versa.

As illustrated, the elastic distributed computing architecture 400 includes a network element referred to as a Multimedia Resource Function and/or a Multipoint Control Unit (MRF/MCU 402). As discussed above, various connections or connection types can be utilized with the disclosed embodiments. Such connection types can be utilized with the architecture of FIG. 4, however, all connections pass through the MRF/MCU 402, as illustrated.

In another embodiment, the end device (e.g., UE) can send information related to resource distribution, task split, and so on, to all cloud-edge nodes (e.g., not just information about that particular node). Sending this information can be helpful in situations when the end device does not have enough resources to compile all the processed tasks from the various cloud-edges.

In the same or another embodiment, there can be various scenarios that can be helpful in compiling different processed tasks from various cloud-edge when the end node is out of resources. For example, when there is a network-based element, such as the MRF/MCU 402 as illustrated in FIG. 4. In this case, the end device can signal the MRF/MCU 402 about the scarcity of resources at the end device. Based on the signal, the MRF/MCU 402 can compile different tasks and send the finished task to the end device. This signaling can be performed via SDP or RTP header extension. If STP is used, a parameter "resource_process" can be used to signal. Alternatively, if RTP header extension is used, the following URI can be used:

uri:extmap:rtp-hdrext: resource_process.

Alternatively, when a network-based element (e.g., the MRF/MCU 402) is not present (as in FIG. 1), the end device can signal one of the cloud-edges to act as the master compiler. When this occurs, the end device would also need to signal the other cloud-edge which are processing a part of the task the address (or other identification information) of the master compiler. This can be performed via UDP signaling, for example.

The disclosed embodiments can be implemented as computer software using computer-readable instructions and physically stored in one or more computer-readable media. For example, FIG. 5 illustrates an example, non-limiting, computer system 500 suitable for implementing various embodiments of the disclosed subject matter in accordance with one or more embodiments described herein.

The computer software can be coded using any suitable machine code or computer language that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, internet of everything devices, and the like.

Figure 5:
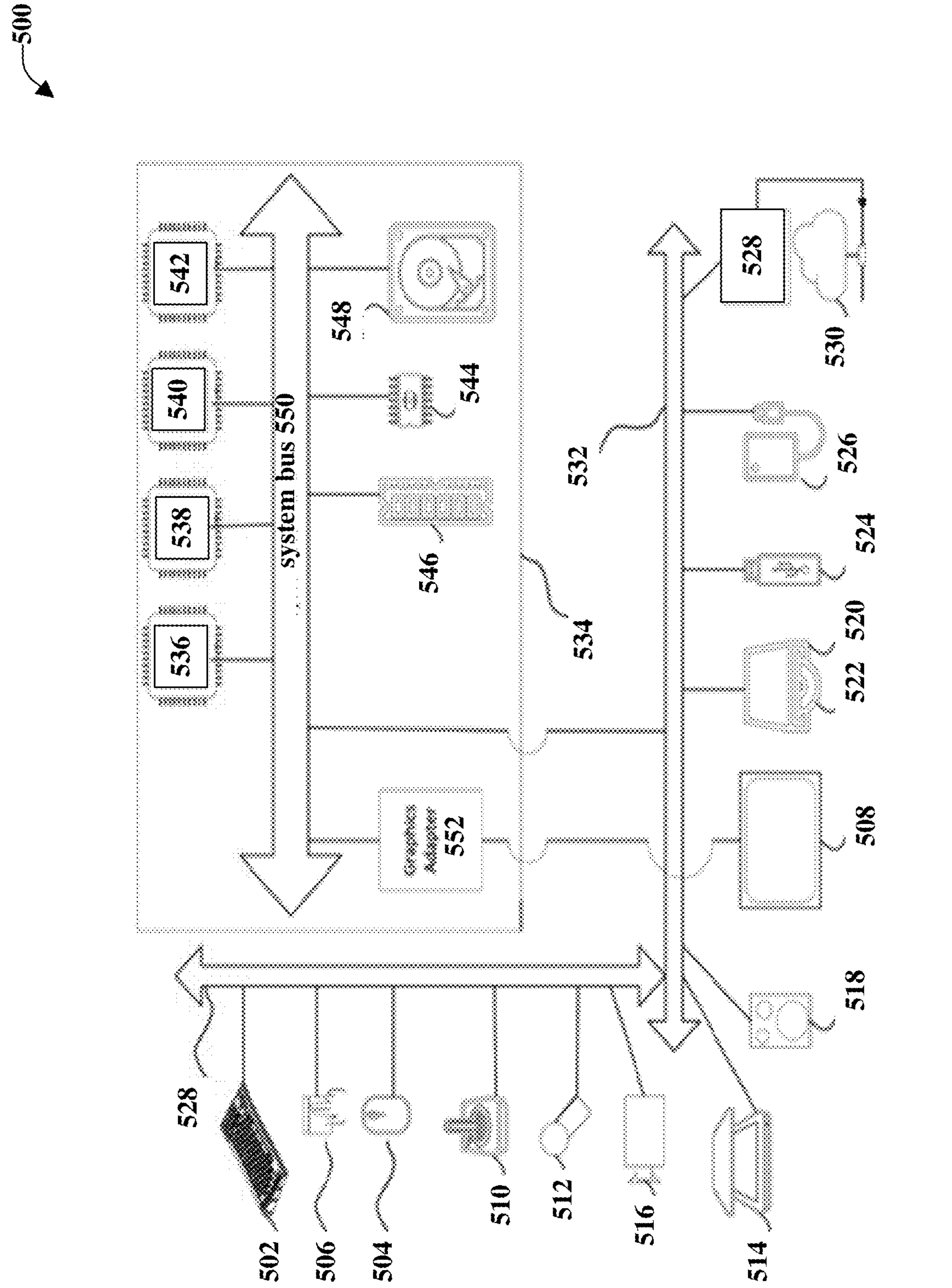
FIG. 5 illustrates an example, non-limiting, computer system suitable for implementing various embodiments of the disclosed subject matter in accordance with one or more embodiments described herein.

The components illustrated in FIG. 5 for the computer system 500 are exemplary and are not intended to suggest any limitation as to the scope of use or functionality of the computer software implementing embodiments of the disclosed embodiments. Neither should the configuration of components be interpreted as having any dependency or requirement relating to any one or combination of components illustrated in the exemplary embodiment of the computer system 500.

The computer system 500 can include various human interface input devices. Such human interface input devices can be responsive to input by one or more human users through, for example, tactile input (e.g., keystrokes, swipes, data glove movements), audio input (e.g., voice, clapping), visual input (e.g., gestures), olfactory input (not depicted). The human interface devices can also be used to capture certain media not necessarily directly related to conscious input by a human, such as audio (e.g., speech, music, ambient sound), images (e.g., scanned images, photographic images obtained from a still image camera), video (e.g., two-dimensional video, three-dimensional video including stereoscopic video).

Input human interface devices may include, but are not limited to, one or more of: a keyboard 502, a mouse 504, a trackpad 506, a screen 508 (e.g., a display, a touch screen), a data-glove (not illustrated), a joystick 510, a microphone 512, a scanner 514, and/or a camera 516. Further, there can be more than one of each of the input human interface devices.

The computer system 500 can also include various human interface output devices. Such human interface output devices can be devices that stimulate the senses of one or more human users through, for example, tactile output, sound, light, smell, and/or taste. Such human interface output devices can include, but are not limited to, one or more of: tactile output devices (e.g., tactile feedback by the screen 508, data-glove (not depicted), and/or the joystick 510). In some implementations, there can also be tactile feedback devices that do not serve as input devices. Other examples of human interface output devices can include, but are not limited to, one or more of: audio output devices (e.g., speakers 518, headphones (not illustrated), and visual output devices (e.g., the screen 508). The screen 508 can include, but are not limited to, Cathode-Ray Tube (CRT) screens, Liquid Crystal Display (LCD) screens, plasma screens, Organic Light-Emitting Diode (OLED) screens, and so on. The screen can be a screen that includes, or that does not include, touch-screen input capability, tactile feedback capability, and so forth. In some cases, the screen can be capable of outputting two-dimensional visual output, three-dimensional visual output, or more than three-dimensional visual output through various means such as stereographic output. Other examples of human interface output devices can include, but are not limited to, one or more of: virtual-reality glasses (not illustrated), holographic displays and smoke tanks (not illustrated), and printers (not illustrated).

The computer system 500 can also include human accessible storage devices and their associated media. Examples include optical media including Compact Disc (CD), Digital Video Disc (DVD), Read Only Memory (ROM) and/or Read Write (RW) 520 with CD and/or DVD or the like media 522, thumb-drive 524, removable hard drive or solid-state drive 526, legacy magnetic media such as tape and floppy disc (not illustrated), specialized ROM, ASIC/PLD based devices, such as security dongles (not illustrated), and the like.

The computer system 500 can also include an interface 528 to one or more communication networks 530. Networks, for example, can be wireless, wireline, optical, and so on. Networks can be local, wide-area, metropolitan, vehicular, and industrial, real-time, delay-tolerant, and so on. Examples of networks include, but are not limited to, LANs such as Ethernet, wireless LANs, cellular networks, which can include GSM, 3G, 4G, 5G, 6G, LTE, New Radio (NR), and the like. Other examples of networks include, but are not limited to, TV wireline or wireless wide-area digital networks, which can include cable TV, satellite TV, and terrestrial broadcast TV. Networks can also include, but are not limited to vehicular and industrial, which can include a Controller Area Network (CAN bus), and so forth. Certain networks can utilize external network interface adapters that are attached to various general-purpose data ports and/or peripheral buses 532 (e.g., USB ports of the computer system 500). Some network interface adapters can be integrated into the core of the computer system 500 by attachment to a system bus as described below (e.g., Ethernet interface into a PC computer system or cellular network interface into a smartphone computer system). Using any of these networks, the computer system 500 can communicate with other entities (e.g., other computer systems, other networks, network equipment, user equipment, and so on). Such communication can be unidirectional, receive only (e.g., broadcast TV), unidirectional send-only (e.g., CAN bus to certain CAN bus devices), or bi-directional (e.g., to other computer systems using local or wide area digital networks). Certain protocols and protocol stacks can be used on each of those networks and network interfaces, as described above.

The aforementioned human interface devices, human-accessible storage devices, and network interfaces can be attached to a core 534 of the computer system 500. The core 534 can include one or more Central Processing Units (CPU) 536, one or more Graphics Processing Units (GPU) 538, specialized programmable processing units in the form of Field Programmable Gate Arrays (FPGA) 540, hardware accelerators 542 (e.g., for defined tasks), and so forth. These devices, along with Read-Only Memory (ROM 544), Random-Access Memory (RAM 546), and/or internal mass storage 548 (such as internal non-user accessible hard drives, SSDs, graphics adapter 552, and the like) can be connected through a system bus 550. In some computer systems, the system bus 550 can be accessible in the form of one or more physical plugs to enable extensions by additional CPUs, GPUs, and so on. The peripheral devices can be attached either directly to the system bus 550 or through a peripheral bus of the peripheral buses 532. Architectures for a peripheral bus include, but are not limited to, PCI, USB, and so forth.

CPUs 536, GPUs 538, FPGAs 540, and/or hardware accelerators 542 can execute certain instructions that, in combination, can include computer code for the above noted embodiments. That computer code can be stored in the ROM 544 and/or the RAM 546. Transitional data can also be stored in the RAM 546, whereas permanent data can be stored, for example, in the internal mass storage 548. Fast storage and retrieval to any of the memory devices can be enabled through the use of cache memory, which can be closely associated with one or more of the CPUs 536, the GPUs 538, the internal mass storage 548, the ROM 544, the RAM 546, and so on.

The computer-readable media can have computer code thereon for performing various computer-implemented operations. The media and computer code can be specially designed and constructed for the purposes of the disclosed embodiments, according to some implementations.

As an example, and not limitation, the computer system 500, with the illustrated architecture, and specifically the core 534, can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 534 that are of non-transitory nature, such as the internal mass storage 548 or the ROM 544. The software implementing various embodiments of the disclosed embodiments can be stored in such devices and executed by the core 534. A computer-readable medium can include one or more memory devices or chips, according to particular needs. The software can cause the core 534 and the processors therein (including CPU, GPU, FPGA, and the like) to execute particular processes or particular parts of particular processes described herein, including defining data structures stored in RAM 546 and modifying such data structures according to the processes defined by the software. In addition, or as an alternative, the computer system 500 can provide functionality as a result of logic hardwired or otherwise embodied in a circuit (for example, the hardware accelerators 542), which can operate in place of, or together with, software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosed embodiments encompass any suitable combination of hardware and software.

Figure 6:
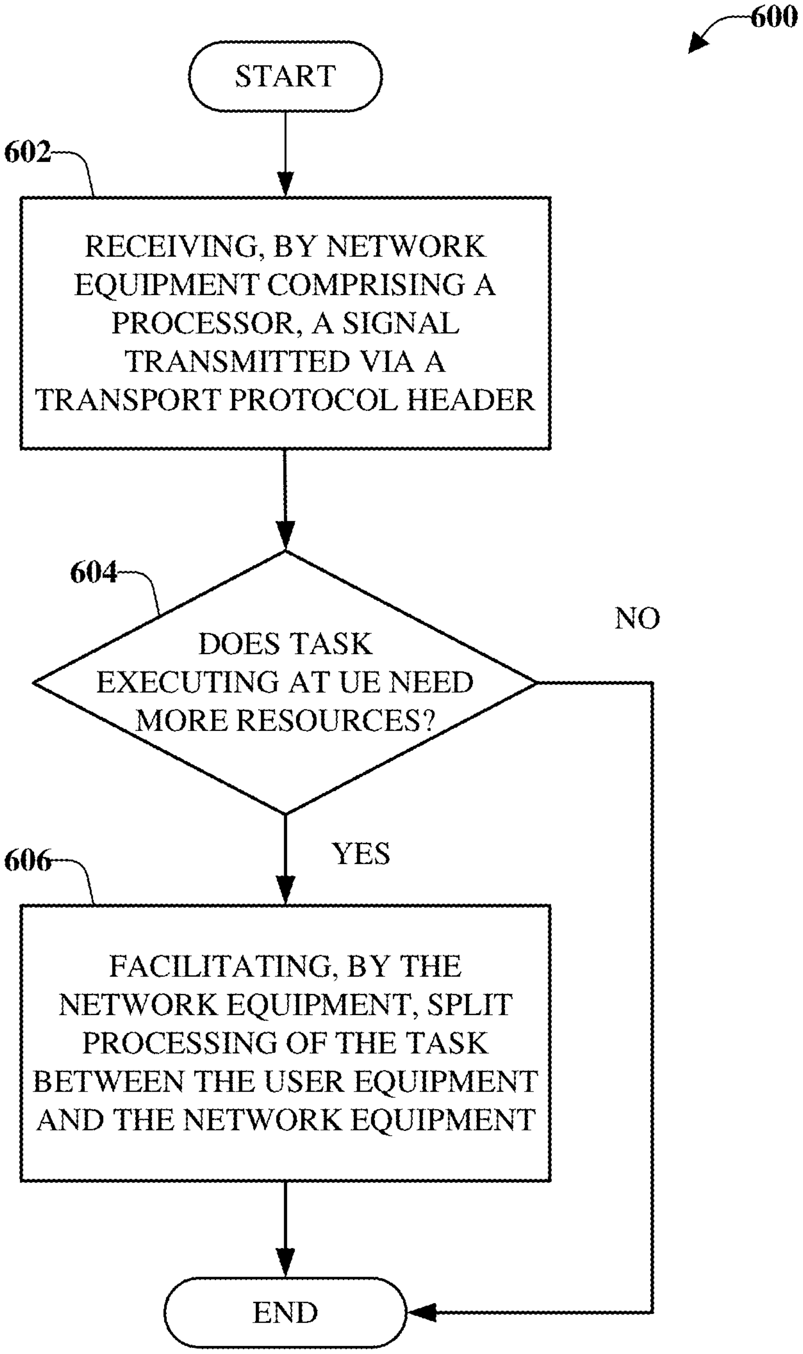
FIG. 6 illustrates an example, non-limiting, computer-implemented method for facilitating signaling to enable split rendering in accordance with one or more embodiments described herein.

In further detail, FIG. 6 illustrates an example, non-limiting, computer-implemented method 600 for facilitating signaling to enable split rendering in accordance with one or more embodiments described herein. Repetitive description of like elements employed in other embodiments described herein is omitted for sake of brevity. The computer-implemented method 600 can be implemented by a system including a memory and a processor, user equipment including memory and a processor, network equipment including a memory and a processor, a network controller including a memory and a processor, or another computer-implemented device including a memory and a processor.

The computer-implemented method 600 starts at 602, with receiving, by network equipment comprising a processor, a signal transmitted via a transport protocol header. According to some implementations, the transport protocol header is a real-time transport protocol header. Further, at 604, a determination can be made whether a task executing at a user equipment (UE or end device) needs more resources than are available at the UE. According to some implementations, the signal received at 602 can include an indication that the UE needs more resources and/or an indication that the UE does not need more resources and has the capability itself to process the task.

For example, the indication can be an RTP header extension "enable_split_rendering," which can indicate whether the UE needs split rendering or does not need split rendering. The RTP header extension "enable_split_rendering" can be signed by the UE, the edge, and/or the cloud.

If the determination is that the UE has enough resources ("NO"), the computer-implemented method 600 ends. Alternatively, it the determination at 604 is that the UE needs more resources ("YES"), at 606, the network equipment can facilitate split processing of the task between the user equipment and the network equipment. The split processing can also be referred to as split rendering or divided processing (e.g., processing of the UE is offloaded to the edge, the cloud, other equipment, other UEs, or combinations thereof).

Facilitating the split processing can include facilitating split processing of the task between the user equipment and edge network equipment. Alternatively, or additionally, facilitating the split rendering can include facilitating split processing of the task between the user equipment and cloud network equipment.

By utilizing the split processing, a need for the UE to have a GPU based or high resource availability can be reduced and/or mitigated, which can enable metaverse services for a larger number of UEs (e.g., end users). Further, the split processing (split rendering) can conserve resources at the UE (e.g., processing capability, battery charge, and so on).

The split processing can be different types of connection types. The connection types can be, for example, between a single UE and a single cloud-edge node; between a single UE and multiple cloud-edge nodes; between multiple UEs and multiple cloud-edge nodes; between a first UE and a second UE; and/or between one UE and multiple other UEs.

According to some implementations, the receiving at 602 can include receiving a transport protocol header extension from the user equipment. Alternatively, or additionally, the receiving can include receiving information indicative of a latency tolerance defined for the task executing at the user equipment. Alternatively, or additionally, the receiving can include receiving priority information indicative of a priority of the task executing at the user equipment. According to some implementations, the edge and/or the cloud can use task priority parameters to prioritize tasks during a stressed situation and/or to determine whether to accept a task.

The signal transmitted via the transport protocol header can be a broadcast signal that comprises resource distribution information indicative of a resource distribution applicable to the task executing at the user equipment. The transport protocol header can be a real-time transport protocol header.

Figure 7:
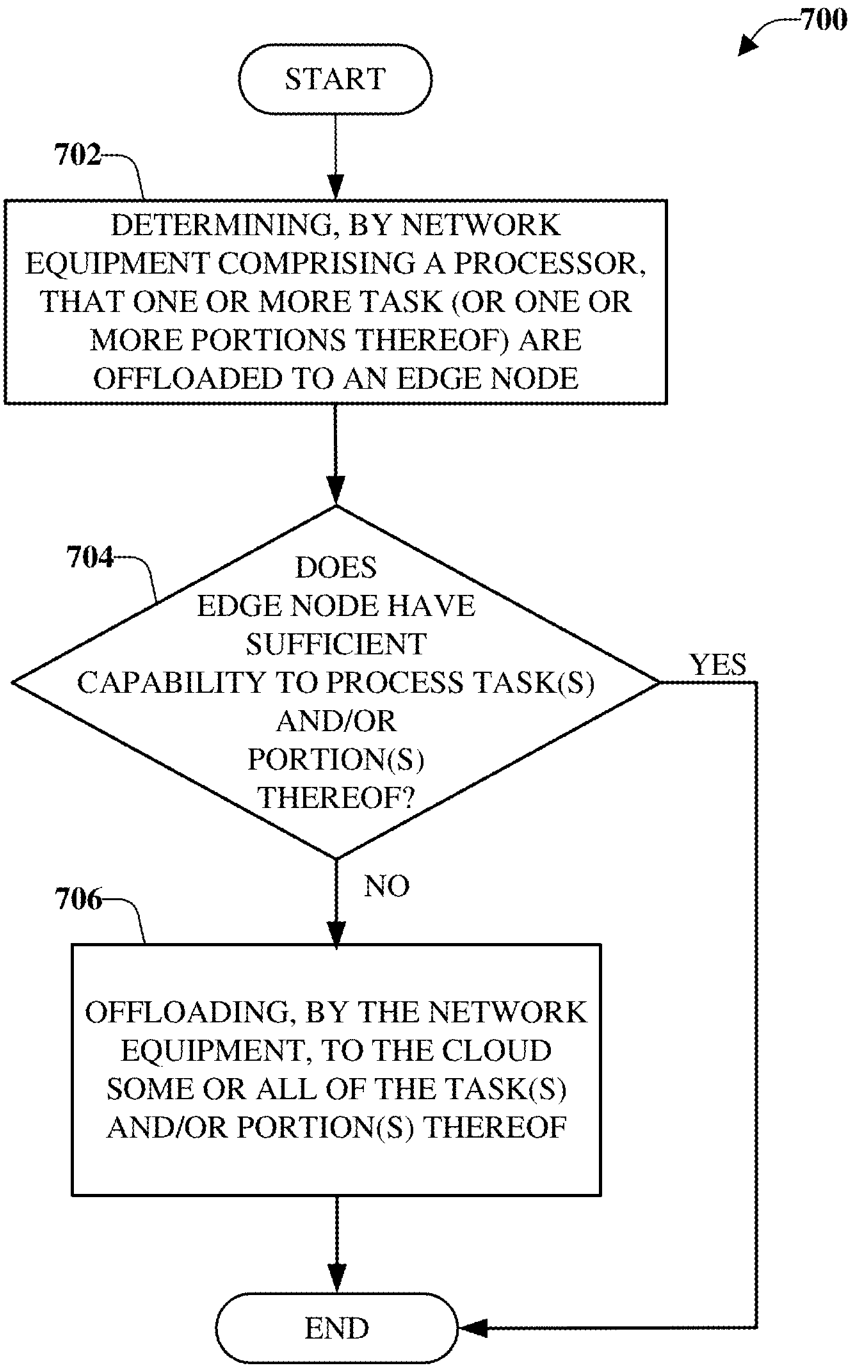
FIG. 7 illustrates an example, non-limiting, computer-implemented method for offloading one or more tasks, or portions thereof, among various equipment in accordance with one or more embodiments described herein.

FIG. 7 illustrates an example, non-limiting, computer-implemented method 700 for offloading one or more tasks, or portions thereof, among various equipment in accordance with one or more embodiments described herein. Repetitive description of like elements employed in other embodiments described herein is omitted for sake of brevity. The computer-implemented method 700 can be implemented by a system including a memory and a processor, user equipment including memory and a processor, network equipment including a memory and a processor, a network controller including a memory and a processor, or another computer-implemented device including a memory and a processor.

At 702 the computer-implemented method 700 determines that one or more tasks, or a portion thereof (e.g., a portion of a single task, one or more portions of one or more tasks) is offloaded to an edge node (or more than one edge node). A determination is made, at 704, whether the edge node has sufficient capability (e.g., available resources) to process the task(s) and/or portion(s) thereof. If the edge node has sufficient capability ("YES"), the computer-implemented method 700 ends. However, if the edge node does not have sufficient capability ("NO"), at 706 some or all tasks are offloaded to the cloud. According to some implementations, the determination to offload one or more tasks can be based on a determination that a time to process the task at the device will take longer than a defined interval as compared to a processing time for one or more other devise to perform the task.

Figure 8:
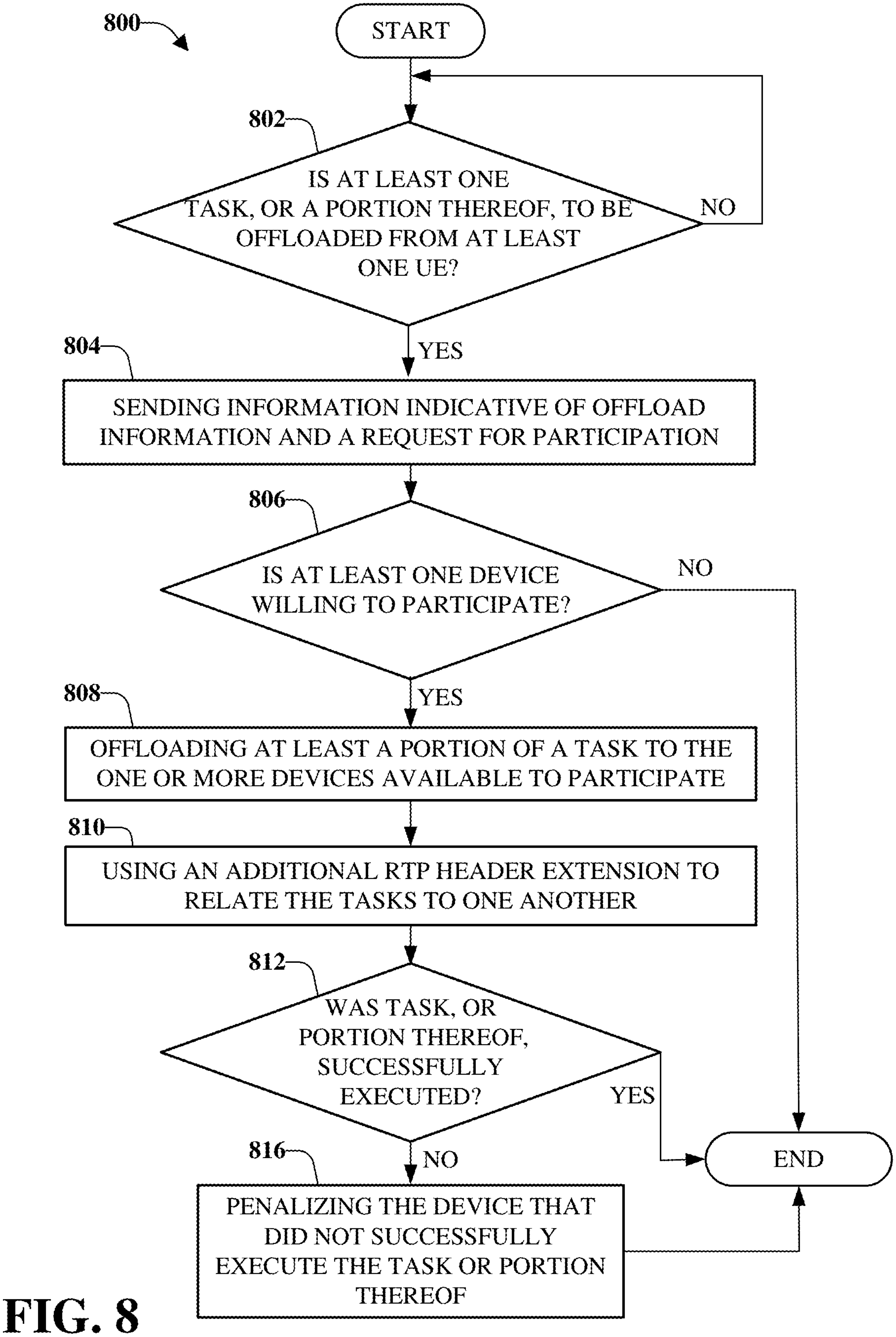
FIG. 8 illustrates an example, non-limiting, computer-implemented method for facilitating participation in distributed cooperative computing in accordance with one or more embodiments described herein.

FIG. 8 illustrates an example, non-limiting, computer-implemented method 800 for facilitating participation in distributed cooperative computing in accordance with one or more embodiments described herein. Repetitive description of like elements employed in other embodiments described herein is omitted for sake of brevity. The computer-implemented method 800 can be implemented by a system including a memory and a processor, user equipment including memory and a processor, network equipment including a memory and a processor, a network controller including a memory and a processor, or another computer-implemented device including a memory and a processor.

At 802 the computer-implemented method 800 can determine whether at least one task, or a portion of the task, is to be offloaded from at least one UE. The determination can be made based on receipt of a signal transmitted via transport protocol header extension (e.g., a real-time transport protocol header). For example, the RTP streams packet can indicate, in an RTP header extension, split of the resources between the different devices.

If the determination is that there are no tasks, or portions thereof to be offloaded ("NO"), the computer-implemented method 800 returns to 802. However, if the determination is that there is a task, or a portion thereof, to be offloaded ("YES"), at 804, information indicative of the offload information can be sent with a request for participation. For example, a device from which the task, or portion thereof, is to be offloaded can transmit a signal to other devices (e.g., end devices, UEs, network equipment, and so on). The signal can be a broadcast signal that includes one or more UDP messages that request (e.g., check) if one or more of the other devices are willing to participate in distributed cooperative computing.

At 806 a determination is made whether at least one device is willing to participate. If there are no devices willing to participate ("NO"), the computer-implemented method 800 ends. A determination by a device whether it is willing (or able to) participate can be based on the resources available at the device (e.g., a capability of the device, other tasks being executed by the device, and so on). If the determination at 806 is that at least one device is willing to participate ("YES"), at 808 at least a portion of a task is offloaded to the device (or to multiple devices, depending on the number of devices that replied in the affirmative.

During the offloading, at 810, an additional RTP header extension can be utilized to relate all the tasks, or portions thereof, when the task (or related tasks) have been divided and sent to multiple devices (e.g., multiple edge, cloud, and/or end user devices).

At 812, a determination can be made whether the device to which the task, or portion thereof, has been offloaded has successfully performed the task. If the task was successfully performed ("YES"), the computer-implemented method 800 can end. Alternatively, if it is determined that the task was not successfully performed ("NO"), at 814 the device can be penalized. For example, an entity associated with the device can be charged a fine or have to pay a fee for the lack of service. By providing a penalty for not performing the action accepted, it can be an incentive for better service in the future as devices that are unsure of whether or not the task can be successfully performed can instead deny the task. Information related to the device(s) to which the task was offloaded, whether or not the task was completed, and other information can be retained in a data store as historical information and utilized during subsequent offloading procedures to determine whether or not to request offloading of a particular device.

Figure 9:
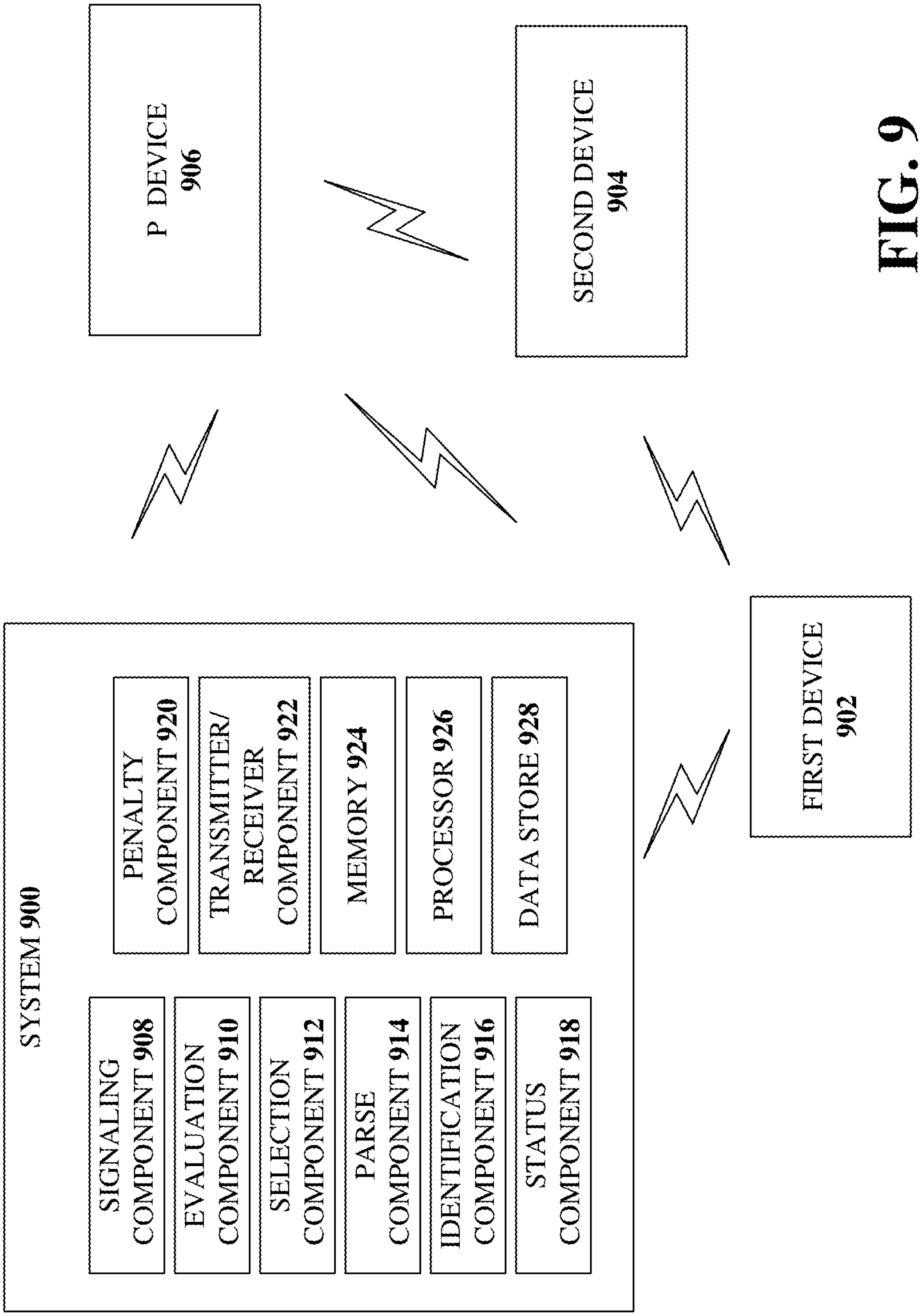
FIG. 9 illustrates an example, non-limiting, system that facilitates elastic distributed computing for resource intensive tasks in accordance with one or more embodiments described herein.

FIG. 9 illustrates an example, non-limiting, system 900 that facilitates elastic distributed computing for resource intensive tasks in accordance with one or more embodiments described herein. Repetitive description of like elements employed in other embodiments described herein is omitted for sake of brevity. The system 900 can be configured to perform functions associated with the distributed computing architecture 100 of FIG. 1, the elastic distributed computing architecture 400 of FIG. 5, the computer system 500 of FIG. 5, the computer-implemented methods other systems, other processes, and/or other embodiments discussed herein, and vice versa.

Aspects of systems (e.g., the system 900 and the like), equipment, UEs, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

As illustrated in FIG. 9, the system includes a first device 902, a second device 904, and a P device, where P is an integer. It is noted that although the system 900 is illustrated as separate from the devices, in some implementations, the devices can include one or more components and/or one or more functionalities, or subsets thereof, of the system 900. The devices (e.g., the first device 902, the second device 904, the P device 906) can be, for example, the end devices and/or the network equipment of FIG. 1.

In various embodiments, the system 900, the devices, other equipment, other devices, and so on, can be any type of component, machine, device, facility, apparatus, equipment, and/or instrument that includes a processor and/or can be capable of effective and/or operative communication with a wired and/or wireless network. Components, machines, apparatuses, devices, equipment, facilities, and/or instrumentalities that can include the system 900, the devices, other equipment, other UEs, and so on, can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like. Further, according to some implementations, the system 900, the devices, other equipment, other devices, other UEs, and so on can be classified as Internet of Things (IoT) devices, as Internet of Everything (IoE) devices, electric vehicles (including unmanned vehicles, which can be unmanned aerial vehicles), or the like.

Further, in some implementations, the system 900, the devices, other equipment, other UEs, other devices, and so on can be a same type of device (e.g., network equipment, UEs, end devices, and so on). However, the disclosed aspects are not limited to this implementation, and instead, the system 900, the devices, other devices, other equipment, other UEs, and so on, can be different types of devices (e.g., network equipment, UEs, mobile phones, drones, meters, and so on). For example, a first device can be a meter and a second device can be an electric vehicle. In another example, the first device can be a mobile phone, the second device can be a laptop, a third device can be first network equipment, a fourth device can be second network equipment, and so on.

The system 900 can include a signaling component 908, an evaluation component 910, a selection component 912, a parse component 914, an identification component 916, a status component 918, a penalty component 920, a transmitter/receiver component 922, at least one memory 924, at least one processor 926, and at least one data store 928. In various embodiments, one or more of: the signaling component 908, the evaluation component 910, the selection component 912, the parse component 914, the identification component 916, the status component 918, the penalty component 920, the transmitter/receiver component 922, the at least one memory 924, the at least one processor 926, and the at least one data store 928, can be electrically and/or communicatively coupled to one another to perform one or more of the functions of the system 900. In some embodiments, one or more of: the signaling component 908, the evaluation component 910, the selection component 912, the parse component 914, the identification component 916, the status component 918, the penalty component 920, the transmitter/receiver component 922 can include software instructions stored on the at least one memory 924 and/or the at least one data store 928 and executed by the at least one processor 926. The system 900 can also interact with other hardware and/or software components not depicted in FIG. 9.

If one or more tasks (or portions thereof) are to be offloaded from the system 900 (e.g., embodied in a device, such as an end device or UE), the signaling component 908 can transmit one or more indications that split rendering is to be enabled. For example, the signaling component 908 can indicate the split via a RTP header extension. The RTP header extension can be transmitted (e.g., via the transmitter/receiver component 922) to the one or more devices (e.g., the first device 902, the second device 904, through the P device 906). According to some implementations the RTP header extension can be broadcast to all of the devices. However, in some implementations, the RTP header extension can be transmitted to selected devices as determined based on explicit information, implicit information, inferred information, and so on.

In accordance with some implementations, the signaling component 908 can be configured to receive (e.g., via the transmitter/receiver component 922 and as input data) the indication from another device. The received input data can be included in an RTP header extension.

The evaluation component 910 can determine whether one or more tasks should be offloaded from one or more devices to one or more other devices. For example, the determination by the evaluation component 910 can be based on a response to the RTP header extension. According to some implementations, the determination by the evaluation component 910 can be performed without receipt of an explicit instruction in the RTP header extension. In an example, the evaluation component 910 can determine that an available computational resource capacity at the requesting device (e.g., the first device 902 in this example) is insufficient to fully process an application executing at the first device. Other considerations can be that the processing capability is low and, therefore, will take a long time to process, that a battery of the device will drain quickly if the processing is performed, and so on.

Based on the determination by the evaluation component 910, the selection component 912 can select one or more devices to which to offload at least a portion of the processing for the application. In an example, the request to divide or offload the one or more processes can include an indication of the devices to which the offloading should occur. However, in some implementations, the offloading can be to any available device. In this example, the offloading is from the first device 902 to the second device 904 and/or to the P device 906.

In some cases, there might be more computational resources necessary to process the application executing at the first device than one device can handle. For example, the second device 904 might only be able to process a first portion of the application, therefore, a second portion of the application can be processed by at least one other device (e.g., the P device 906). Accordingly, the parse component 914 can selectively divide the processing of the application, or portions thereof, among the devices (e.g., the second device 904, the P device 906, and so on).

The identification component 916 can identify a first portion of the application (or task) with first identification information, a second portion of the application with second identification information, and subsequent portions of the application with subsequent identification information. The identification information enables a mapping between the divided portions of the application.

According to some implementations, the selection of which device (or devices) to offload to can be determined by the selection component 912 based on a nearness (or proximity) of the devices to the requesting device. For example, the application can be offloaded to nearby devices, rather than devices that are farther away. The nearby devices can be devices that have been determined to have satisfied a defined nearness criterion with respect to a nearness to the first device 902. The nearby devices can be end devices, UEs, network equipment, edge equipment, cloud equipment, and so on.

The status component 918 can evaluate a progress of the processing at the receiving devices and can determine whether or not a particular device has successfully executed the processing. Information related to which devices the task was offloaded to, the portion of the task offloaded, the amount of time needed to process the portion of the task, whether the processing was successfully completed, and so forth, can be retained in the at least one memory 924, the data store 928, and/or another storage media. Such information can be retained as historical information and utilized for subsequent offloading of tasks as discussed herein.

If the status component 918 determines that a device did not successfully perform the processing, the penalty component 920 can access a penalty to the device. For example, the device can be owned by an entity and that entity is charged a fee or is otherwise administered a penalty for accepting to process a task, but not successfully doing so. According to some implementations, a fee can be charged to perform the processing of the task and, if the task is not successfully performed, a refund can be given, the fee can be waived, or another type of penalty can be imposed.

With continuing reference to FIG. 9, the at least one memory 924 can be operatively connected to the at least one processor 926. The at least one memory 924 and/or the at least one data store 928 can store executable instructions that, when executed by the at least one processor 926 can facilitate performance of operations. Further, the at least one processor 926 can be utilized to execute computer executable components stored in the at least one memory 924 and/or the at least one data store 928.

For example, the at least one memory 924 can store protocols associated with facilitating signaling for elastic distributed computing system resource intensive tasks, which can include split rendering as discussed herein. Further, the at least one memory 924 can facilitate action to control communication between the system 900, other systems, equipment, network equipment, and/or user equipment such that the system 900 can employ stored protocols and/or processes to facilitate energy harvesting and power sharing as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory.

The at least one processor 926 can facilitate distributed processing of tasks, such as resource intensive tasks, as discussed herein. The at least one processor 926 can be a processor dedicated to analyzing and/or generating information received, a processor that controls one or more components of the system 900, and/or a processor that both analyzes and generates information received and controls one or more components of the system 900.

Figure 10:
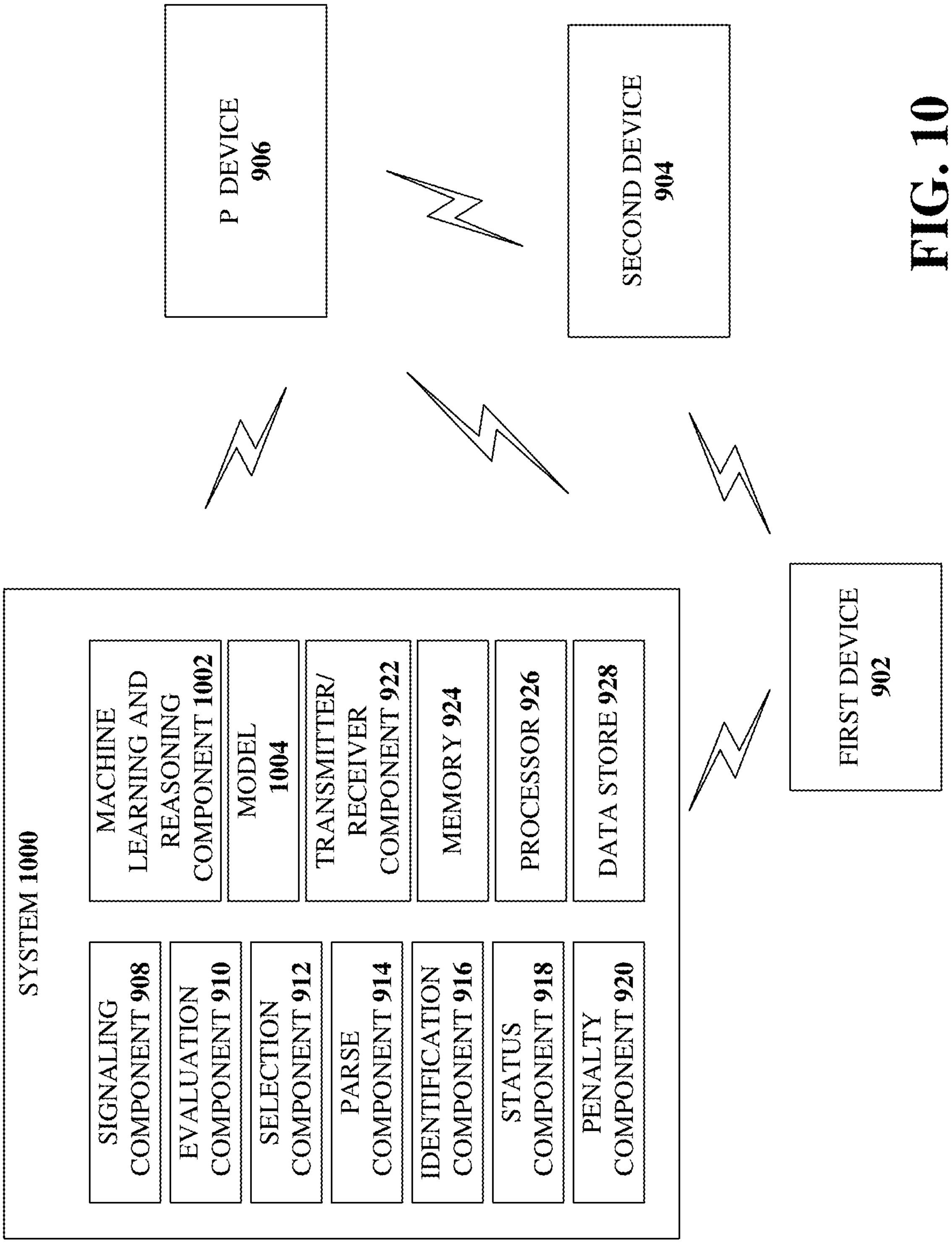
FIG. 10 illustrates an example, non-limiting, system that employs automated learning that trains a model to facilitate one or more of the disclosed aspects in accordance with one or more embodiments described herein.

FIG. 10 illustrates an example, non-limiting, system 1000 that employs automated learning that trains a model to facilitate one or more of the disclosed aspects in accordance with one or more embodiments described herein. Repetitive description of like elements employed in other embodiments described herein is omitted for sake of brevity. The system 1000 can be configured to perform functions associated with the distributed computing architecture 100 of FIG. 1, the elastic distributed computing architecture 400 of FIG. 4, the computer system 500 of FIG. 5, the system 1100, the computer-implemented methods, other systems, other processes, and/or other embodiments discussed herein, and vice versa.

The system 1000 can utilize machine learning to train a model to identify opportunities related to managing offloading of resource intensive tasks. The model can be trained to a defined confidence level. As illustrated, the system 1000 can comprise a machine learning and reasoning component 1002 that can be utilized to automate one or more of the disclosed aspects based on training a model 1004. The machine learning and reasoning component 1002 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 1002 can employ principles of probabilistic and decision theoretic inference. Additionally, or alternatively, the machine learning and reasoning component 1002 can rely on predictive models (e.g., the model 1004) constructed using automated learning and/or automated learning procedures. Logic-centric inference can also be employed separately or in conjunction with probabilistic methods.

For example, the machine learning and reasoning component 1002 can be used to train the model 1004 to determine which tasks (or portions thereof) should be offloaded, to which device(s) to offload the task(s), and so on. The machine learning and reasoning component 1002 can infer to which resources (e.g., devices) of a communication network should be utilized to facilitate the processing of the resource intensive tasks.

As used herein, the term "inference" refers generally to the process of reasoning about or inferring states of a system, a component, a module, an environment, and/or devices from a set of observations as captured through events, reports, data and/or through other forms of communication. Inference can be employed to identify when corrective measures, such as selectively offloading a task or portion thereof, when to reassign processing of a task from one device to another device (e.g., when a first selected device is taking too long to process the task, when a first selected device has indicated that it can no longer process the task (e.g., due to respective priorities of the task as compared to another task or due to another reason)). Further, the inference can be employed to identify when corrective measures, such as which actions should be taken to improve a user experience, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with signaling for offloading resource intensive tasks in 4G communication networks, 5G communication networks, 6G communication networks, new radio communication networks, and/or other advanced networks) can employ various artificial intelligence-based schemes for carrying out various aspects thereof. For example, a process for determining if one or more devices can handle processing of the task and can dynamically provide a metaverse experience, how to merge UEs, services, objects, and/or resources of physical network and virtual networks, and so on can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine when and how to processes metaverse resources (e.g., physical and/or virtual resources), which resources to process, how to output metaverse services based on the offloading of the processing of tasks. In the case of offloading, for example, attributes can be identification of one or more devices available to process the task and/or an inferred amount of processing capability that is expected to be utilized to provide the metaverse experience, and so on.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing device feedback associated with processing of task offloaded from an end device, or multiple end devices, an efficiency associated with selection of the devices to which to offload the tasks as compared to other devices not selected, and so on, by receiving extrinsic information (e.g., one or more signals from the equipment), by receiving implicit information, based on an inference, and so on. For example, SVMs can be configured through a learning or training phase within a classifier constructor and feature selection module. Thus, a classifier(s) can be used to automatically learn and perform a number of functions, including but not limited to determining, according to a predetermined criterion, when priority of a device to process a task has changed due to other tasks having a higher priority, when the processing of a task will be delayed and should be offloaded to another device (e.g., from the edge to the cloud, from the cloud to the edge, from the edge and/or cloud to an end device, and vice versa), and so forth. The criteria can include, but is not limited to, historical information, feedback information, the resources that are available, a processing capability needed to provide the metaverse experience, and so forth.

Additionally, or alternatively, an implementation scheme (e.g., a rule, a policy, and so on) can be applied to control offloading of resource intensive tasks as discussed herein, to control the delivery of metaverse services, and so forth. In some implementations, based upon a predefined criterion, the rules-based implementation can automatically and/or dynamically interpret changes to resources and changes to equipment in view of the resource changes, for example. In response thereto, the rule-based implementation can automatically interpret and carry out functions associated with the delivery of metaverse services while mitigating and/or reducing an amount of processing bandwidth and/or memory loss during the metaverse service delivery, by employing a predefined and/or programmed rule(s) based upon any desired criteria.

According to some implementations, seed data (e.g., a data set) can be utilized as initial input to the model 1004 to facilitate the training of the model 1004. For example, the seed data can be a past behavior of the various devices, which can be used as training input to the model 1004. In an example, if seed data is utilized, the seed data can be obtained from one or more historical data associated with available resources, merging of different types of resources, delivery of the metaverse services and/or metaverse experience, and so on. However, the disclosed embodiments are not limited to this implementation and seed data is not necessary to facilitate training of the model 1004. Instead, the model 1004 can be trained on new data received (e.g., input data, a feedback loop, and so on).

The data (e.g., seed data and/or new data) can be collected and, optionally, labeled with various metadata. For example, the data can be labeled with an indication of the communication protocol being utilized for communication amongst the equipment, respective applications executing on the equipment, or other data, such as identification of respective equipment that provided one or more resources, feedback from one or more users related to the metaverse services received, feedback from one or more users related to the metaverse experience, and so on.

Figure 11:
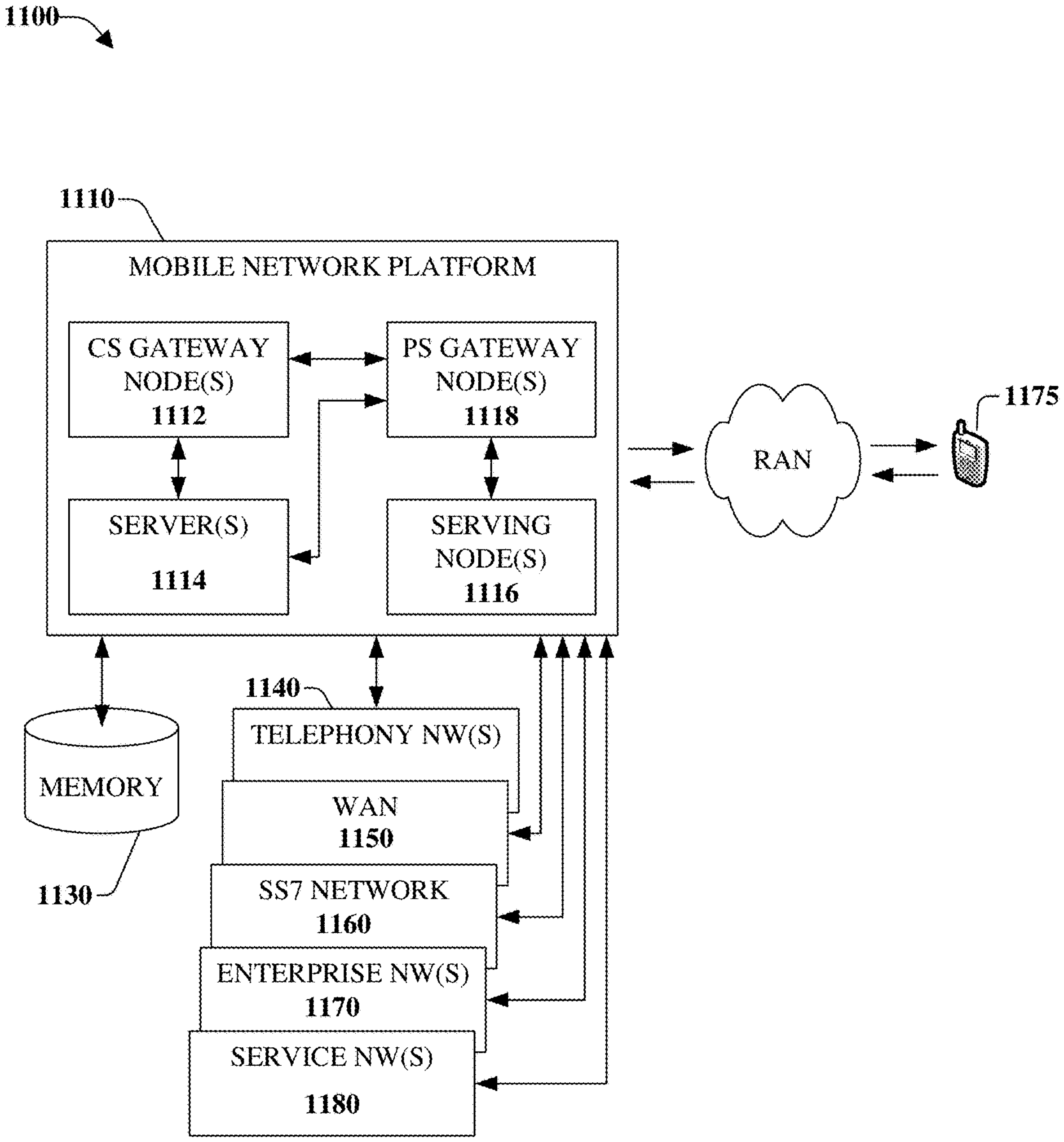
FIG. 11 illustrates an example block diagram of a non-limiting embodiment of a mobile network platform in accordance with various aspects described herein.

Described herein are systems, methods, articles of manufacture, non-transitory machine-readable medium, and other embodiments or implementations that can facilitate signaling for elastic distributed computing systems for resource intensive tasks. FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, which facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1110 can be included in telecommunications carrier networks and can be considered carrier-side components as discussed elsewhere herein. Mobile network platform 1110 includes CS gateway node(s) 1112 which can interface CS traffic received from legacy networks such as telephony network(s) 1140 (e.g., public switched telephone network (PSTN), or public land mobile network (PLMN)) or a signaling system #7 (SS7) network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the Mobile Management Entities (MMEs), Home Subscriber Server/Policy and Charging Rules Functions (HSS/PCRFs), Serving Gateways (SGWs), and Packet Data Network Gateways (PGWs) disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) such as IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processors can execute code instructions stored in memory 1130, for example. It should be appreciated that server(s) 1114 can include a content manager, which operates in substantially the same manner as described hereinbefore.

In example embodiment 1100, memory 1130 can store information related to operation of wireless network platform 1110. Other operational information can include provisioning information of mobile devices served through wireless network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
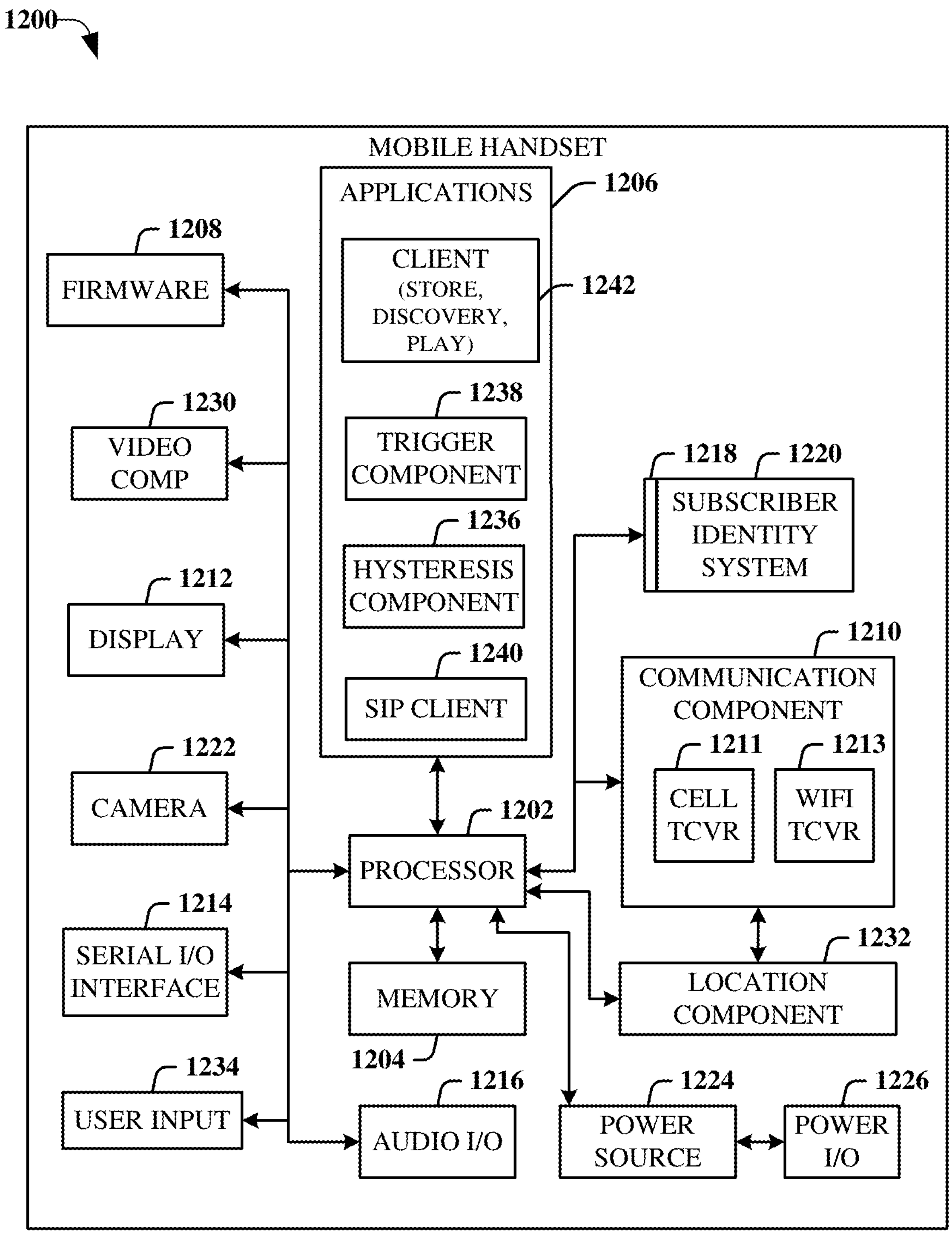
FIG. 12 illustrates an example, non-limiting, block diagram of a handset operable to engage in a system architecture that facilitates wireless communications according to one or more embodiments described herein.

Referring now to FIG. 12, illustrated is an example, non-limiting, block diagram of a handset 1200 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208 and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220 and interfacing the SIM card 1220 with the processor 1202. However, it is to be appreciated that the SIM card 1220 can be manufactured into the handset 1200 and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touchscreen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for a dual-mode GSM handset. The handset 1200 can accommodate at least satellite radio services through a handset that can combine wireless voice and digital radio chipsets into a single handheld device.

Figure 13:
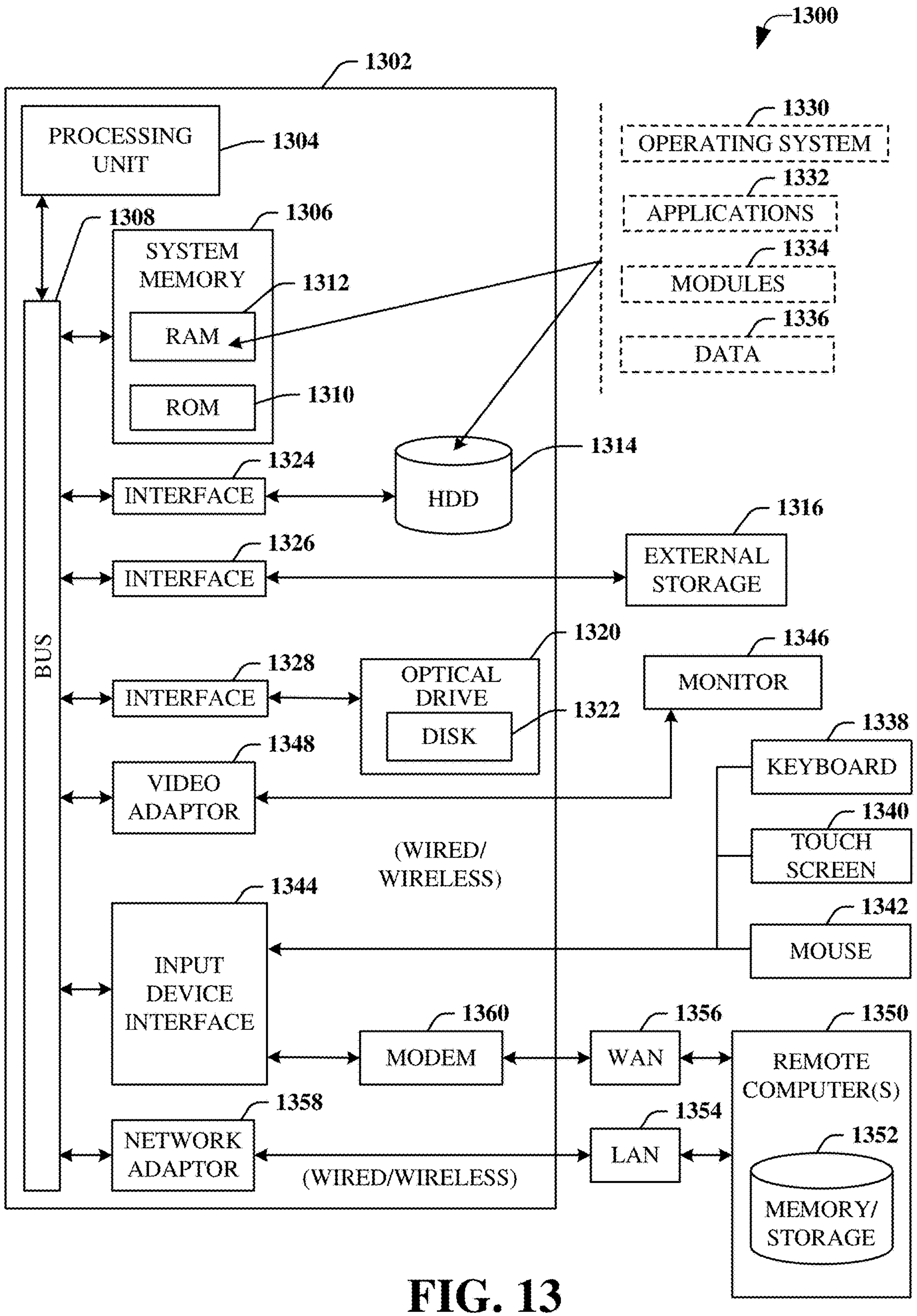
FIG. 13 illustrates an example, non-limiting, block diagram of a computer operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A Basic Input/Output System (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For example, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by network equipment comprising a processor, a signal transmitted via a transport protocol header that comprises a request for split processing;

based on the signal, determining, by the network equipment, that a task executing at a user equipment utilizes more than a defined level of resources;

based on the determining, facilitating, by the network equipment, split processing of the task between the user equipment and one or more of a plurality of other equipment, the plurality of other equipment comprising one or more other user equipment, one or more edge equipment, one or more cloud-based equipment, or a combination thereof, wherein the transport protocol header is included in a first packet of a first stream of packets, wherein at least one subsequent packet of the first stream of packets includes an additional signal indicative of resource sufficiency of the user equipment, and wherein the facilitating is based on sending a request to the one or more of the plurality of other equipment to participate in the split processing and making a request-accepted determination that the one or more of the plurality of other equipment have accepted the request, wherein both the sending the request and the making the request-accepted determination are preconditions to the facilitating the split processing;

assigning, by the network equipment, a respective portion of the task to each of the one or more of the plurality of other equipment;

monitoring, by the network equipment, status information for each of the one or more of the plurality of other equipment, the status information indicative of at least one of progress, completion, or resource availability for the respective portion assigned to that equipment;

sending, by the network equipment to each of the one or more of the plurality of other equipment, a second stream of packets, wherein a first packet of the second stream includes a task-management transport protocol header extension that includes an assignment of a portion of the task to the respective other equipment, and wherein each of one or more subsequent packets of the second stream includes a task-management transport protocol header extension only when updating the portion of the task assigned to the respective other equipment;

determining, by the network equipment, whether at least one equipment of the one or more of the plurality of other equipment has successfully performed the portion of the task assigned to the at least one equipment; and assessing, by the network equipment, a penalty against the at least one equipment based on determining that the at least one equipment has not successfully performed the portion of the task assigned to the at least one equipment.

2. The method of claim 1, wherein the request comprises one or more User Datagram Protocol (UDP) messages requesting that the one or more of the plurality of other equipment indicate whether the one or more of the plurality of other equipment are willing to participate in the split processing.

3. The method of claim 1, wherein the making of the request-accepted determination comprises receiving, from the one or more of the plurality of other equipment, one or more responses indicative of acceptance of the request.

4. The method of claim 1, wherein the transport protocol header that comprises the request for split processing comprises a transport protocol header extension that comprises the signal.

5. The method of claim 1, wherein the receiving comprises receiving information indicative of a latency tolerance defined for the task executing at the user equipment.

6. The method of claim 1, wherein the receiving comprises receiving priority information indicative of a priority of the task executing at the user equipment.

7. The method of claim 1, wherein the signal is a broadcast signal that comprises resource distribution information indicative of a resource distribution applicable to the task executing at the user equipment.

8. The method of claim 1, wherein the transport protocol header is a real-time transport protocol header.

9. The method of claim 1, wherein the user equipment is an internet of things device.

10. A system, comprising:

a processor; and a memory that stores executable instructions that, when executed by the processor, facilitate performance of operations, comprising:

receiving information indicative of a request for split rendering on behalf of an application executing at a user equipment, wherein the information is received via a transport protocol header extension, and wherein the transport protocol header extension comprises the request for split rendering;

based on the information indicative of the request, determining that an available computational resource capacity at the user equipment is insufficient to process the application executing at the user equipment;

based on the determining, enabling a first rendering of a first portion of the application at a first device and a second rendering of a second portion of the application at a second device different from the first device, wherein the transport protocol header extension is included in a first packet of a first stream of packets, wherein at least one subsequent packet of the first stream of packets includes additional information that is indicative of computational resource sufficiency of the user equipment, and wherein the enabling involves a second request sent to the second device to participate in the split rendering and a determination that the second device has accepted the second request, wherein both the second request and the determination that the second device has accepted the second request are preconditions to the enabling;

assigning a respective portion of the application to the second device;

monitoring status information for the second device, the status information indicative of at least one of progress, completion, or resource availability for the respective portion assigned to the second device;

sending, to the second device, a second stream of packets, wherein a first packet of the second stream includes a task-management transport protocol header extension that includes an assignment of the respective portion of the application to the second device, and wherein each of one or more subsequent packets of the second stream includes a task-management transport protocol header extension only when updating the respective portion of the application assigned to the second device;

determining whether the second device has successfully performed the respective portion of the application assigned to the second device; and assessing a penalty against the second device based on a determination that the second device has not successfully performed the respective portion of the application assigned to the second device.

11. The system of claim 10, wherein the first rendering comprises a first execution of the first portion of the application at the first device, and wherein the second rendering comprises a second execution of the second portion of the application at the second device.

12. The system of claim 10, wherein the first device is the user equipment, and wherein the second device is network equipment.

13. The system of claim 10, wherein the user equipment is first user equipment, wherein the first device is the first user equipment, and wherein the second device is a second user equipment.

14. The system of claim 10, wherein the first device is edge equipment, and wherein the second device is cloud equipment.

15. The system of claim 10, wherein the operations further comprise:

identifying the first portion with first identification information and the second portion with second identification information, wherein the first identification information and the second identification information enable a mapping between the first portion and the second portion.

16. The system of claim 10, wherein the user equipment is classified as an internet of everything device.

17. A non-transitory machine-readable medium, comprising executable instructions that, when executed by a processor, facilitate performance of operations, comprising:

receiving an indication, via a real-time transport protocol header extension, that a resource-intensive application is to be enabled for a user equipment via an elastic computing system;

migrating the resource-intensive application from the user equipment to elastic computing equipment associated with the elastic computing system, wherein the real-time transport protocol header extension is included in a first packet of a first stream of packets, wherein at least one subsequent packet of the first stream of packets includes an additional indication of resource sufficiency of the user equipment, and wherein the migrating is based on a request sent to the elastic computing equipment to participate in task division and a determination that the elastic computing equipment has accepted the request, wherein both the request and the determination that the elastic computing equipment has accepted the request are preconditions to the migrating;

assigning a respective portion of the resource-intensive application to the elastic computing equipment;

monitoring status information for the elastic computing equipment, the status information indicative of at least one of progress, completion, or resource availability for the respective portion assigned to the elastic computing equipment;

sending, to the elastic computing equipment, a second stream of packets, wherein a first packet of the second stream includes a task-management real-time transport protocol header extension that includes an assignment of the respective portion of the resource-intensive application to the elastic computing equipment, and wherein each of one or more subsequent packets of the second stream includes the task-management real-time transport protocol header extension only when updating the respective portion of the resource-intensive application assigned to the elastic computing equipment;

determining whether the elastic computing equipment has successfully performed the respective portion of the resource-intensive application assigned to the elastic computing equipment; and assessing a penalty against the elastic computing equipment based on a determination that the elastic computing equipment has not successfully performed the respective portion of the resource-intensive application assigned to the elastic computing equipment.

18. The non-transitory machine-readable medium of claim 17, wherein the user equipment is a first user equipment, and wherein the elastic computing equipment of the elastic computing system comprises a second user equipment, network equipment, or both the second user equipment and the network equipment.

19. The non-transitory machine-readable medium of claim 18, wherein the network equipment comprises edge equipment and cloud equipment.

20. The non-transitory machine-readable medium of claim 17, wherein the migrating comprises enabling distributed cooperative computing for the user equipment.

* * * * *